United States Patent
Jain

(10) Patent No.: US 9,646,254 B2
(45) Date of Patent: May 9, 2017

(54) PREDICTING NEXT WEB PAGES

(71) Applicant: Amazon Technologies, Inc., Reno, NV (US)

(72) Inventor: Saral Jain, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 345 days.

(21) Appl. No.: 14/311,144

(22) Filed: Jun. 20, 2014

(65) Prior Publication Data

US 2015/0371142 A1  Dec. 24, 2015

(51) Int. Cl.

| G06F 9/44 | (2006.01) |
|---|---|
| G06N 7/02 | (2006.01) |
| G06N 7/06 | (2006.01) |
| G06N 5/04 | (2006.01) |
| G06F 17/30 | (2006.01) |

(52) U.S. Cl.
CPC ....... *G06N 5/048* (2013.01); *G06F 17/30902* (2013.01)

(58) Field of Classification Search
USPC .......................................................... 706/52
See application file for complete search history.

(56) References Cited

U.S. PATENT DOCUMENTS

| 6,182,133 B1* | 1/2001 | Horvitz ............. G06F 17/30902 707/999.008 |
| 8,898,272 B1* | 11/2014 | Young ................. H04L 63/0407 709/223 |
| 9,294,553 B1* | 3/2016 | Vaswani ............. H04L 67/2847 |
| 9,454,515 B1* | 9/2016 | Jain .................... G06F 17/30899 |
| 2013/0297538 A1* | 11/2013 | Gosink ................ G06N 99/005 706/13 |
| 2015/0154506 A1* | 6/2015 | Jain ........................ H04L 67/42 706/12 |
| 2015/0156279 A1* | 6/2015 | Vaswani ................ H04L 67/42 709/203 |
| 2015/0156280 A1* | 6/2015 | Vaswani ................ H04L 67/42 709/203 |

(Continued)

FOREIGN PATENT DOCUMENTS

WO   WO 2007/009252    1/2007

OTHER PUBLICATIONS

Credibility as Signal: Predicting Evaluations of Credibility by a Signal-Based Model Grzegorz Kowalik; Adam Wierzbicki; Tomasz Borzyszkowski; Wojciech Jaworski 2016 IEEE/WIC/ACM International Conference on Web Intelligence (WI) Year: 2016 pp. 113-120, DOI: 10.1109/WI.2016.0026 IEEE Conference Publications.*

(Continued)

*Primary Examiner* — Michael B Holmes
(74) *Attorney, Agent, or Firm* — Klarquist Sparkman, LLP

(57) ABSTRACT

Techniques and solutions for predicting web pages are described. Web page prediction can be performed using prediction models, including aggregate prediction models and user-based prediction models. Prediction models can be used to predict which web page (or which web pages) a user is likely to visit (e.g., to visit next after a current web page). Predicted web pages can be obtained in advance (e.g., pre-fetched and/or pre-rendered). Web page prediction can be performed by server computing environments and/or by client computing devices.

25 Claims, 17 Drawing Sheets

(56) References Cited

U.S. PATENT DOCUMENTS

2015/0371142 A1* 12/2015 Jain ................... G06F 17/30902
706/52
2016/0173575 A1* 6/2016 Vaswani ............. H04L 67/2847
709/203
2017/0011017 A1* 1/2017 Jain ..................... G06F 17/2247

OTHER PUBLICATIONS

Fuzzy based hybrid approach for user request prediction using Markov model Mayank Kalbhor; Kunl Jain 2015 International Conference on Computer, Communication and Control (IC4) Year: 2015 pp. 1-5, DOI: 10.1109/IC4.2015.7375664 IEEE Conference Publications.*
Web Page Prediction by Clustering and Integrated Distance Measure G. Poornalatha; Prakash S. Raghavendra 2012 IEEE/ACM International Conference on Advances in Social Networks Analysis and Mining Year: 2012 pp. 1349-1354, DOI: 10.1109/ASONAM.2012.231 IEEE Conference Publications.*
Prediction of User's Web-Browsing Behavior: Application of Markov Model Mamoun A. Awad; Issa Khalil IEEE Transactions on Systems, Man, and Cybernetics, Part B (Cybernetics) Year: 2012, vol. 42, Issue: 4 pp. 1131-1142, DOI: 10.1109/TSMCB.2012.2187441 IEEE Journals & Magazines.*
Invitation to Pay Additional Fees and, Where Applicable, Protest Fee, International Application No. PCT/US2015/035930, Sep. 14, 2015, 8 pages.
International Search Report and Written Opinion, International Application No. PCT/US2015/035930, Dec. 7, 2015, 16 pages.
Wikipedia.com, "Markov model," <http://en.wikipedia.org/wiki/Markov_model>, 3 pages (accessed May 8, 2014).
Montgomery et al., "Modeling Online Browsing and Path Analysis Using Clickstream Data," <http://www.andrew.cmu.edu/user/a1m3/papers/purchase%20conversion.pdf>, 36 pages (Feb. 24, 2014).

* cited by examiner

PREDICTING NEXT WEB PAGES

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

In some situations, a user utilizing a client computing device performs the same or similar browsing activities on a regular basis. For example, the user may visit the same Web pages on a daily, weekly, or monthly basis. Similarities may also exist between the browsing habits of the user and other users. Some techniques exist to improve browsing performance when content is accessed repeatedly, such as techniques for caching frequently accessed Web pages and associated content. However, such caching techniques may only be beneficial in a limited number of circumstances (e.g., where a large number of users are accessing the same Web content).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
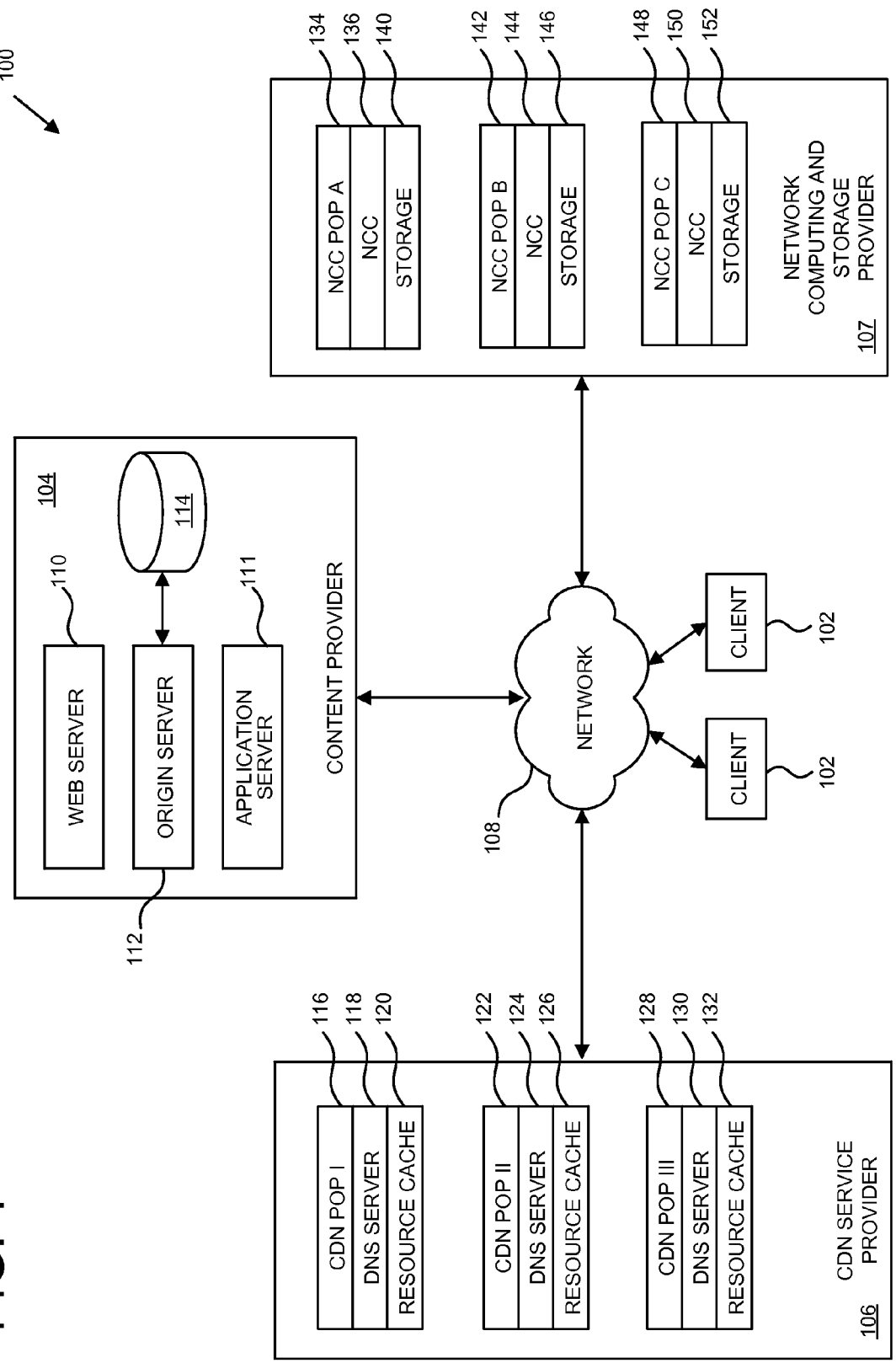
FIG. 1 is a block diagram illustrative of a content delivery environment including a number of client computing devices, content provider, a content delivery network service provider, and a network computing and storage provider.

The following description is directed to techniques and solutions for predicting web pages (e.g., automatically predicting next web pages) that will be selected (e.g., that will be visited after a current web page by a user of a client computing device). For example, a user may be viewing particular web page that contains a number of links (also called "out-links") to other web pages. Based on prediction models, one or more of the linked web pages can be determined as likely to be selected by the user. The likely web pages can be pre-fetched and/or pre-rendered so that they are available for quick and efficient display if the user selects one of the links (e.g., pre-rendered in an off-screen buffer at the client computing device for immediate display if selected by the user).

In some implementations, one or more prediction models are used for predicting which web page (or web pages) will be selected. The prediction models can include aggregate prediction models that are created from aggregate browsing data from a number of users. The prediction models can also include user-based prediction models that are specific to a user and/or to a client computing device.

Web page prediction (e.g., prediction of next web pages) can be performed at a server environment. For example, the server environment can create and store prediction models and/or use prediction models to perform next web page prediction. The server environment can perform web page prediction during browse sessions with client computing devices. Prediction can be performed automatically (e.g., by a server environment and/or a client computing device) and proactively (e.g., in advance of the user selecting a next web page).

Web page prediction can also be performed at a client computing device (e.g., alone or in combination with a server environment). For example, the client computing device can evaluate prediction models to determine which web pages are likely to be visited next by the user and pre-fetch and/or pre-render the likely next web pages.

The technologies described herein for performing web page prediction can provide advantages in various situations, such as increased efficiency in web browsing. For example, browsing patterns (e.g., browsing patterns among a number of users and/or browsing patterns that are user-specific) can be used to generate prediction models that predict which web page (or web pages) a user is likely to select (e.g., likely to select next from a current web page). The likely web pages can then be determined and pre-fetched and/or pre-rendered so that they can be displayed more efficiently (e.g., in less time and/or with fewer computing resources) if the user selects (e.g., clicks on a link or enters in a URL field) one of the likely web pages. Using web page prediction with pre-fetching and/or pre-rendering can be more efficient than waiting for the user to select a web page before downloading the web page and processing it for display.

The various technologies described herein can be implemented by various types of computing devices that use web browser and/or web server technologies (e.g., server computers or client computing devices such as mobile phones, tablets, laptops, desktops, and/or other client computing devices).

Generally described, some aspects of the present disclosure are directed to the generation and management of a remote application session between client computing devices and content providers in conjunction with a network computing and storage provider. Specifically, some aspects of the disclosure will be described with regard to the request for a browse session by a client computing device with a content provider, the establishment of a remote browse session between the client computing device and a network computing and storage provider, and the transmission of browse session state data and client interaction data between the client computing device and the network computing and storage provider. Although some aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing and storage provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing and storage provider, including the selected URL. The address or location of a network computing and storage provider capable to service the browse session request may be hardcoded into the browser, may be configurable by the user, may be obtained from a network address service, or may be determined in any other way.

In an illustrative embodiment, responsive to the browse session request received from the client computing device, the network computing and storage provider may instantiate or cause to have instantiated one or more computing components associated with the network computing and storage provider that will host a browser software application. For example, the network computing and storage provider can instantiate, or cause to have instantiated, an instance of a virtual machine that includes a software browser application capable of requesting resources from a communication network. Illustratively, in some situations, one or more devices associated with the network computing and storage provider may be located in a data center or other robustly networked computing environment, and, as compared to the client computing device, may experience relatively little latency or delay when obtaining network resources.

Using the instantiated network computing components, the network computing and storage provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing and storage provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing and storage provider rather than, or in addition to, at the client computing device. For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing and storage provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing and storage provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing and storage provider 107 may maintain separate POPs for providing the NCC and the storage components. Additionally, although the NCC POPs 134, 142, 148 are illustrated in FIG. 1 as logically associated with a network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Even further, one skilled in the relevant art will appreciate that the components of the network computing and storage provider 107 and components of the CDN service provider 106 can be managed by the same or different entities.

With reference to FIGS. 2-11, the generation and processing of network content in the context of a remote browse session instantiated at a network computing provider 107 will be described. Example embodiments of web page prediction in the context of the networked computing environment of FIG. 1 will be described further below with respect to FIGS. 12 and 13. Additional example embodiments of web page prediction will be described further below with respect to FIGS. 14-16.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing and storage provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
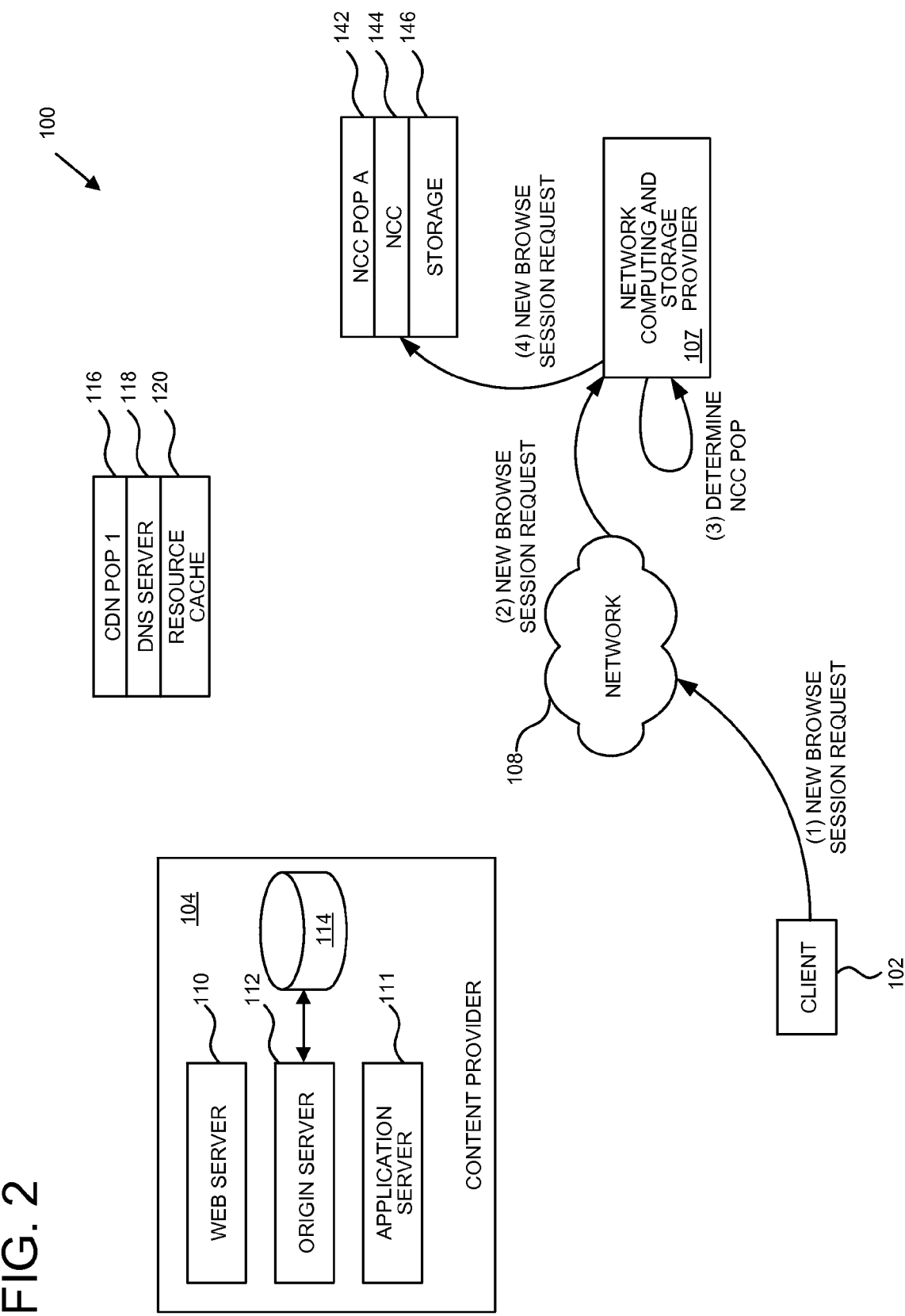
FIG. 2 is a block diagram of the content delivery environment of FIG. 1 illustrating the generation and processing of a new browse session request from a client computing device to a network computing and storage provider.

With reference to FIG. 2, the process can begin with the generation and processing of a browse session request from a client computing device 102 to a network computing and storage provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing and storage provider 107. In an illustrative embodiment, the network computing and storage provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing and storage provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
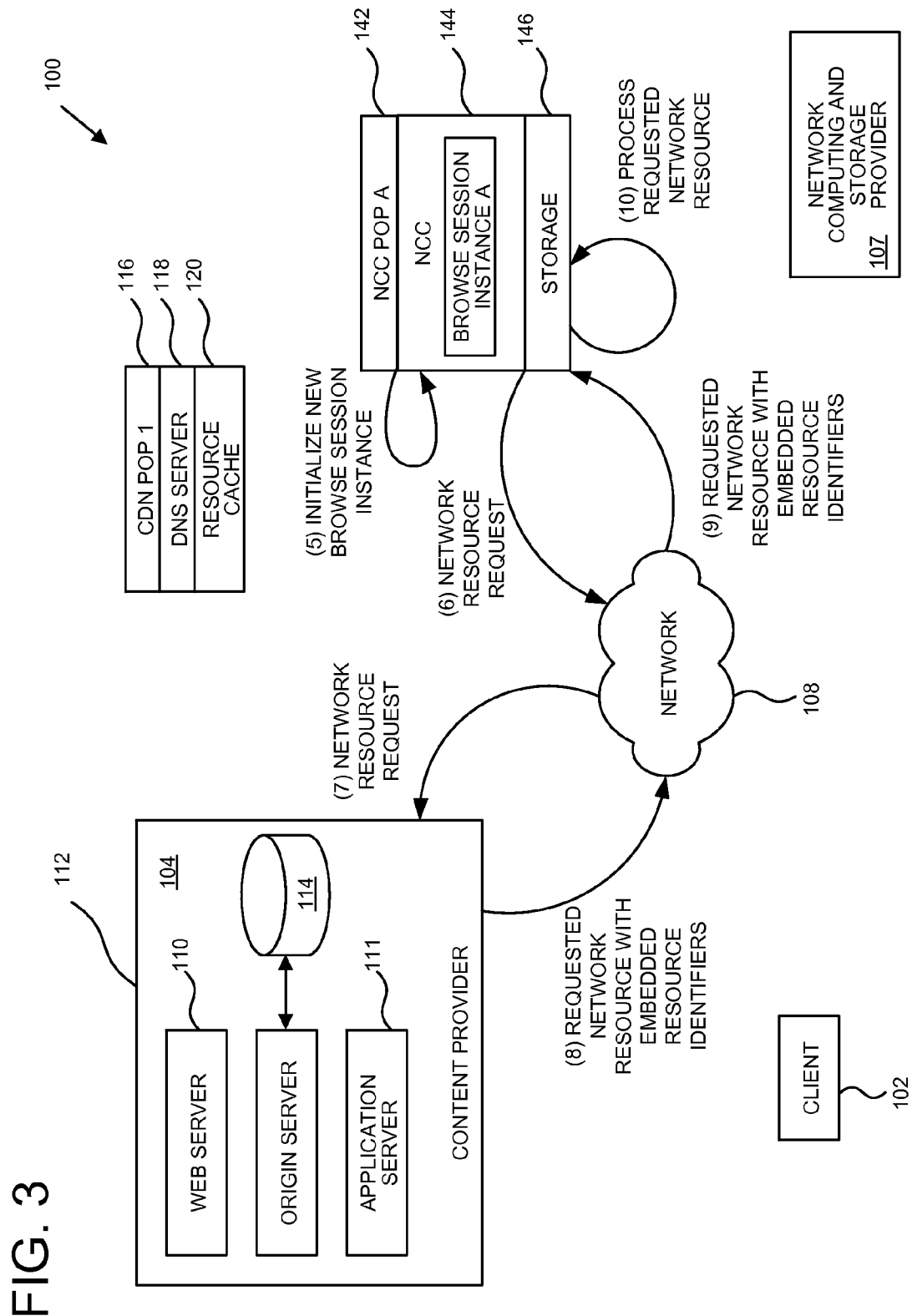
FIG. 3 is a block diagram of the content delivery environment of FIG. 1 illustrating the generation and processing of a request for a network resource from a network computing and storage provider to a content provider.

With reference to FIG. 3, an illustrative interaction for generation and processing of a request for a network resource from a network computing and storage provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing and storage provider (not shown), and may request the Web page from the content provider 104 at the resolved IP address. In various embodiments, a network resource may be retrieved from any combination of content providers, content delivery network (hereinafter "CDN") servers, or caches associated with the network computing and storage provider 107. For example, the network computing and storage provider may check if a resource is stored in a local cache or in another server or service provider associated with the network computing and storage provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
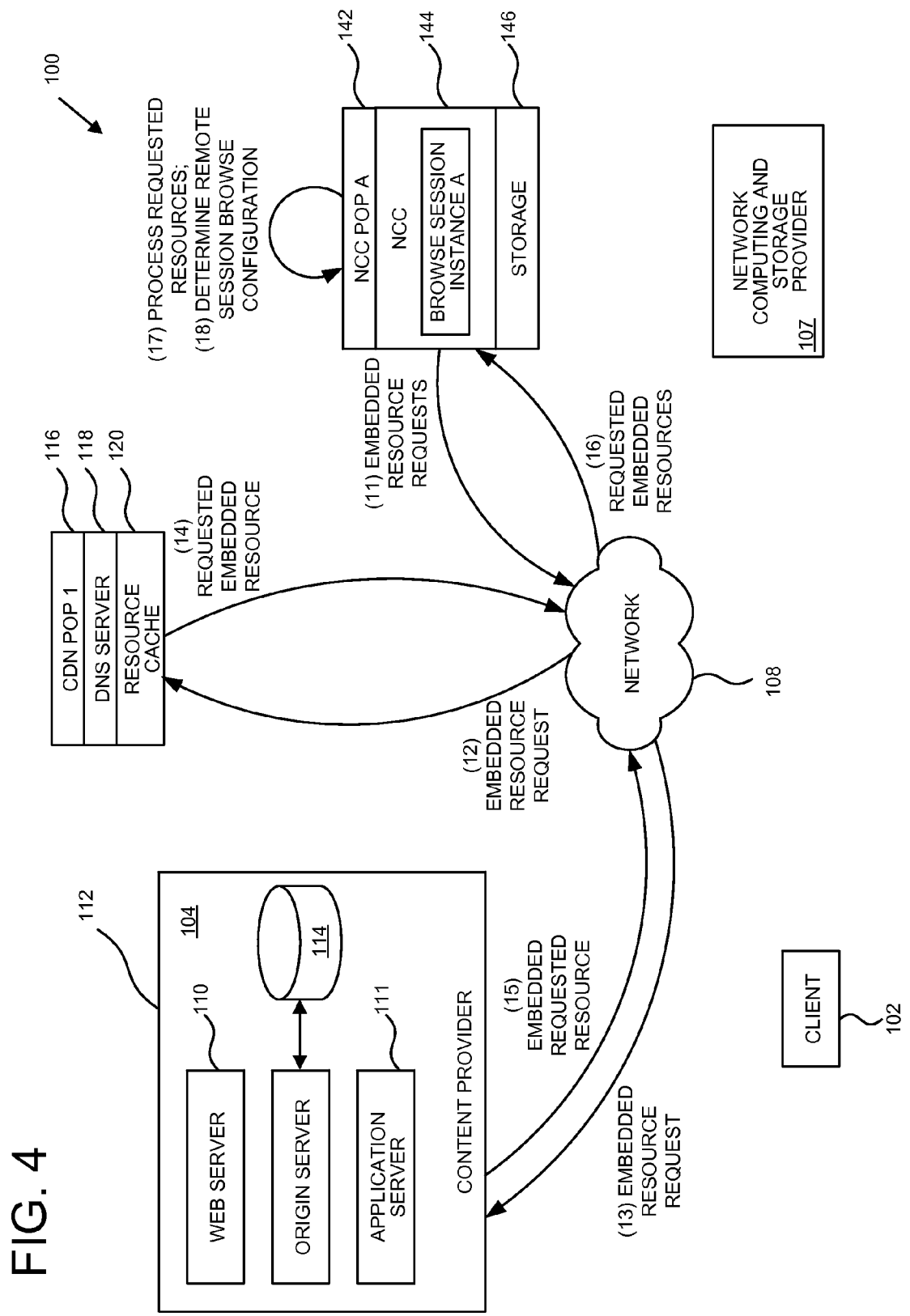
FIG. 4 is a block diagram of the content delivery environment of FIG. 1 illustrating the generation and processing of one or more requests corresponding to one or more embedded resources from a network computing and storage provider to a content provider and content delivery network.

With reference to FIG. 4, an illustrative interaction for generation and processing of one or more requests corresponding to one or more embedded resources from a network computing and storage provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing and storage provider 107. For example, the network computing and storage provider may check if an embedded resource is stored in a local cache or in another server or service provider associated with the network computing and storage provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
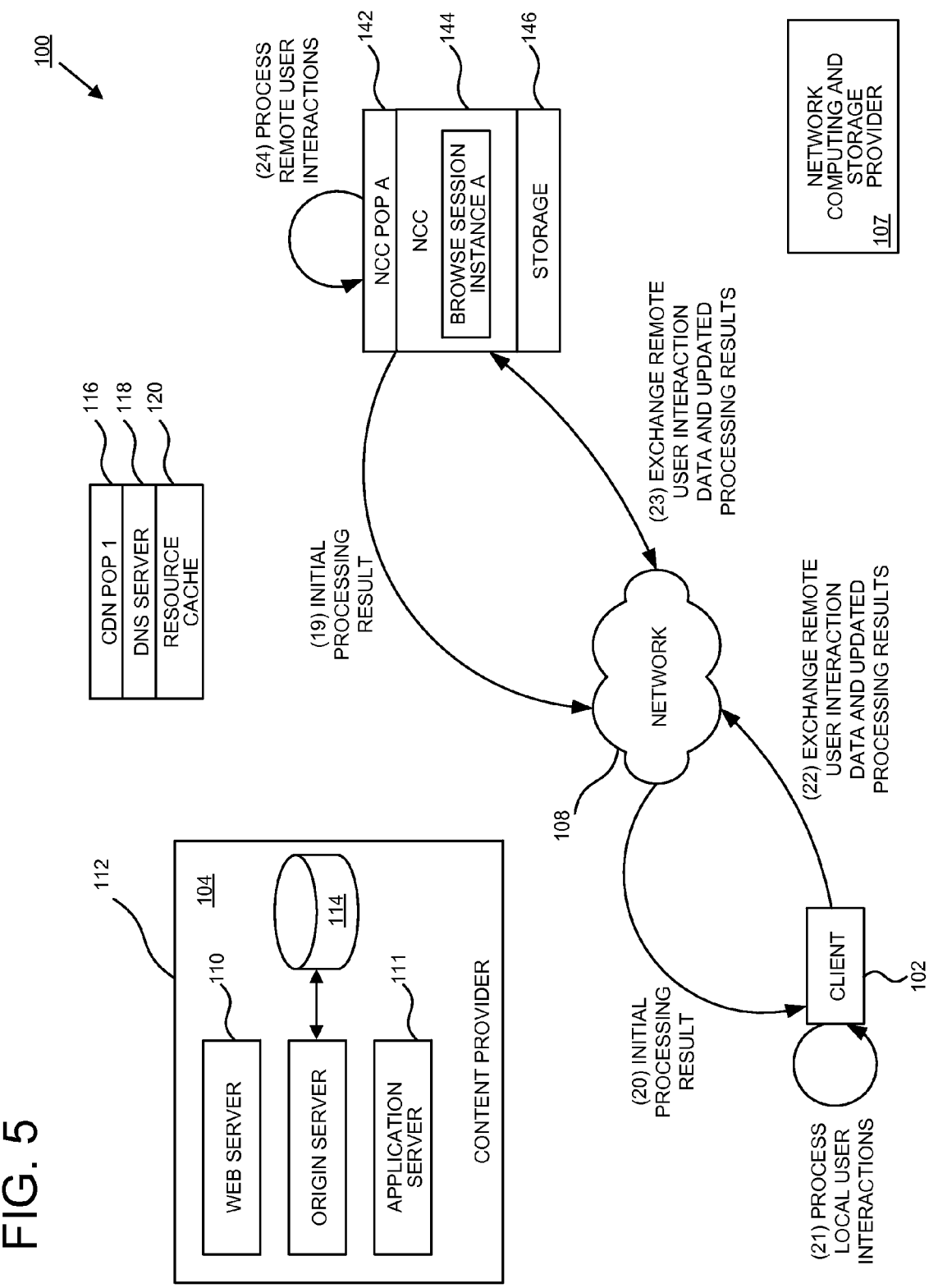
FIG. 5 is a block diagram of the content delivery environment of FIG. 1 illustrating the generation and processing of browse session data and user interaction data between a network computing and storage provider and client computing device.

With reference to FIG. 5, an illustrative interaction for generation and processing of processing results and user interaction data between a network computing and storage provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing and storage provider 107. The network computing and storage provider 107 may provide updated processing results to the client computing device in response to changes to the content or remote user interaction data from the client computing device.

Figure 6:
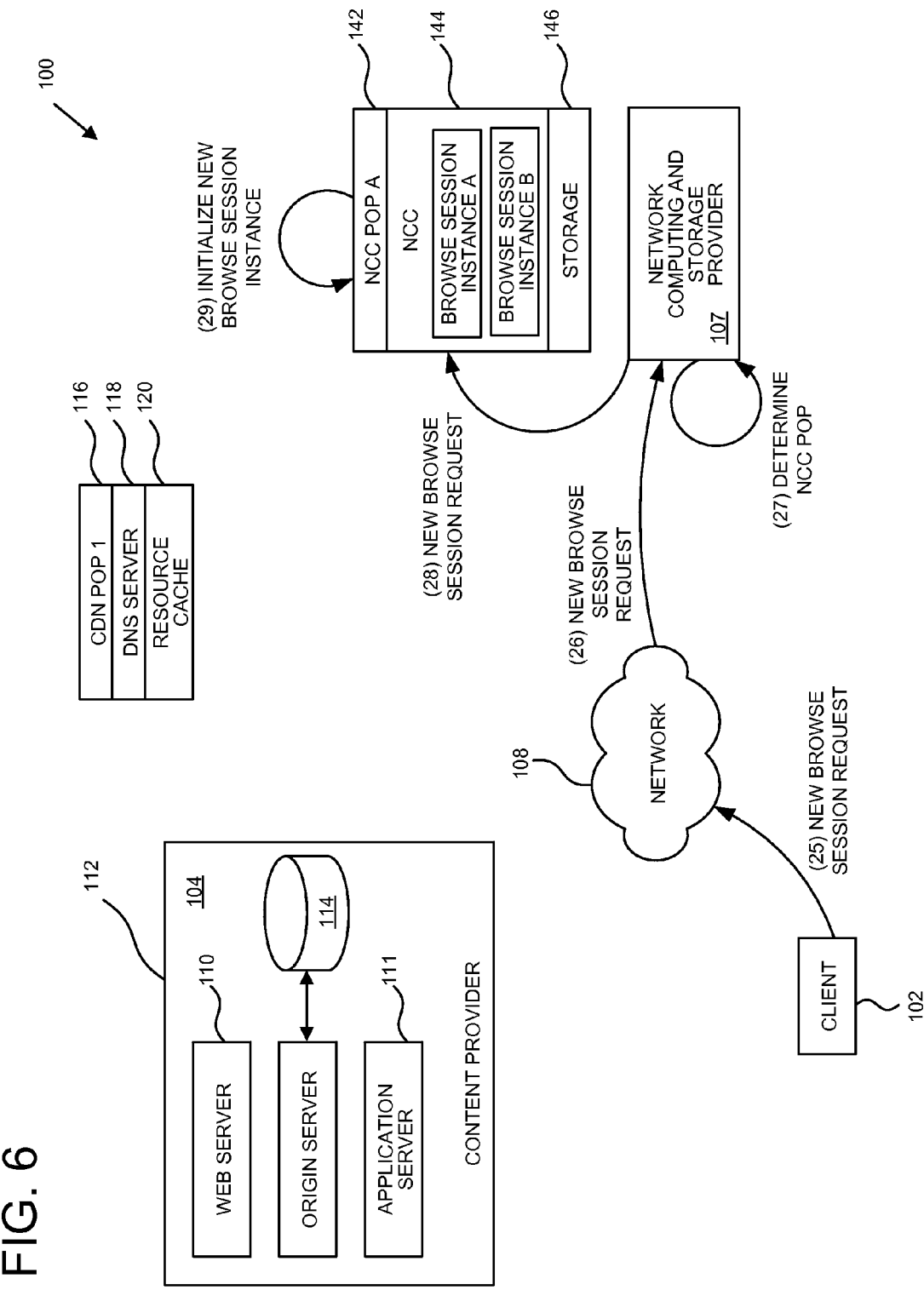
FIG. 6 is a block diagram of the content delivery environment of FIG. 1 illustrating the generation and processing of an additional new browse session request from a client computing device to a network computing and storage provider.

With reference to FIG. 6, a block diagram of the content delivery environment of FIG. 1 illustrating the generation and processing of an additional new browse session request from a client computing device to a network computing and storage provider is disclosed. As illustrated in FIG. 6, a second new browse session request may be sent to network computing and storage provider 107 from client computing device 102 across network 108. In an illustrative embodiment, the network computing and storage provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing and storage provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing and storage provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing and storage provider 107 may select an associated network computing component such as NCC POP 142 to service the browse session request. As discussed above with reference to FIG. 2, a network computing and storage provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing and storage provider 107 may select a number of NCC POPs to service a browse session request. Illustratively, although the network computing and storage provider 107 is depicted here for purposes of illustration as selecting NCC POP 142, the network computing and storage provider 107 may select any extant NCC POP to service the browse session request. For example, a single client computing device 102 may simultaneously or sequentially provide three different browse session requests to the network computing and storage provider 107 corresponding to different network resources. The network computing and storage provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
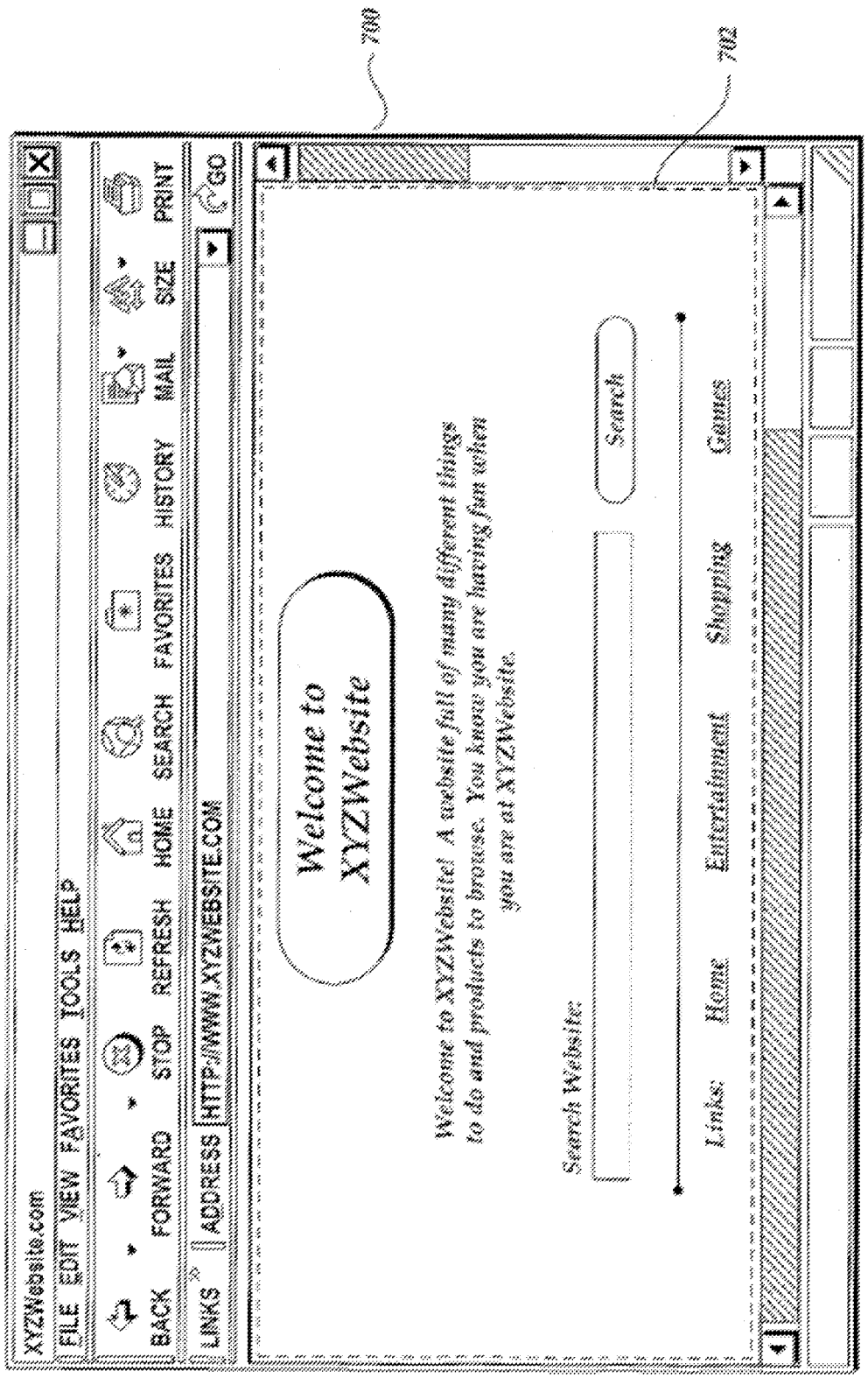
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
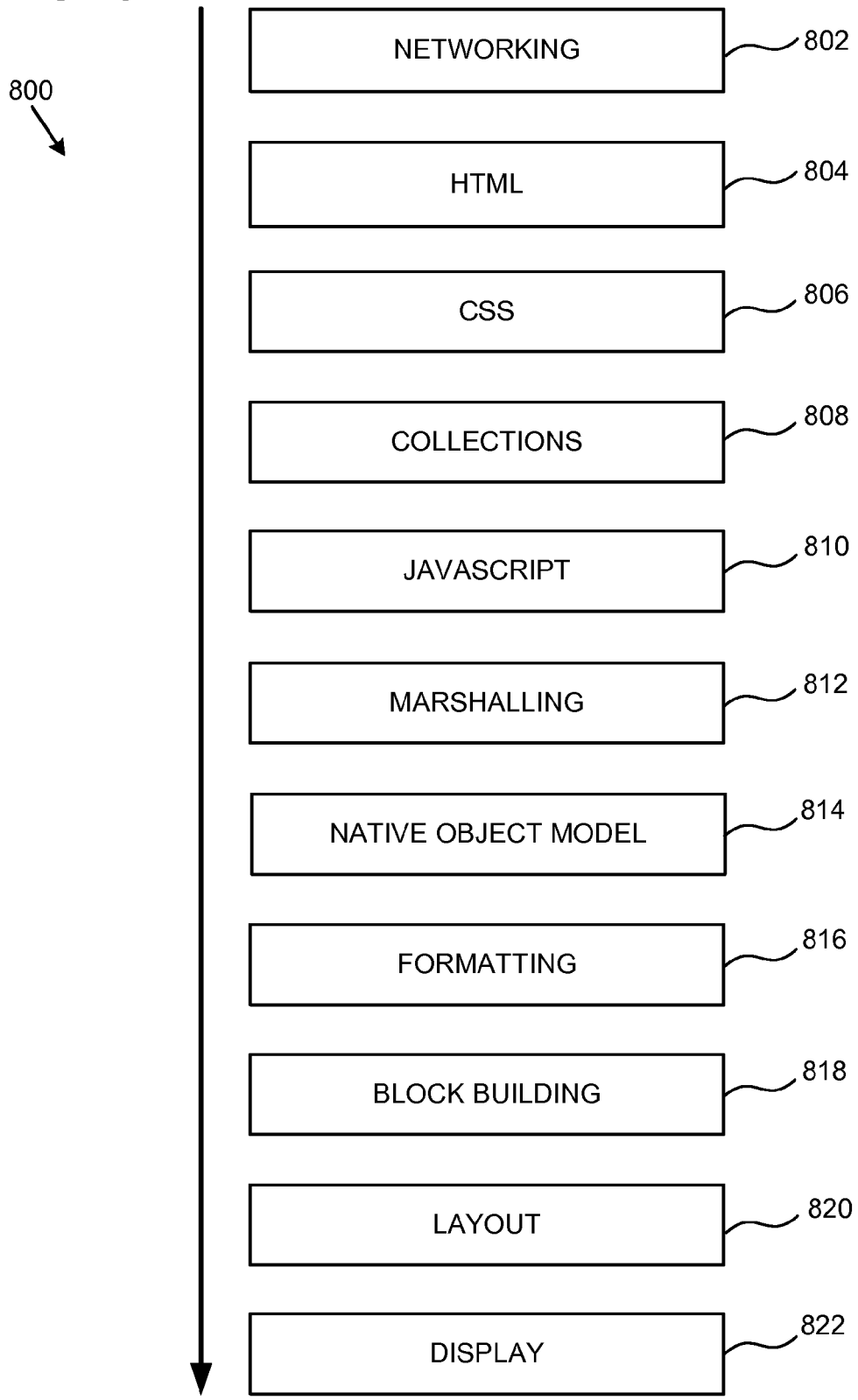
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions (processing operations). Illustratively, and as described above with reference to FIGS. 3-5, a remote session browsing configuration may specify a split between processing actions performed at a network computing and storage provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing and storage provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
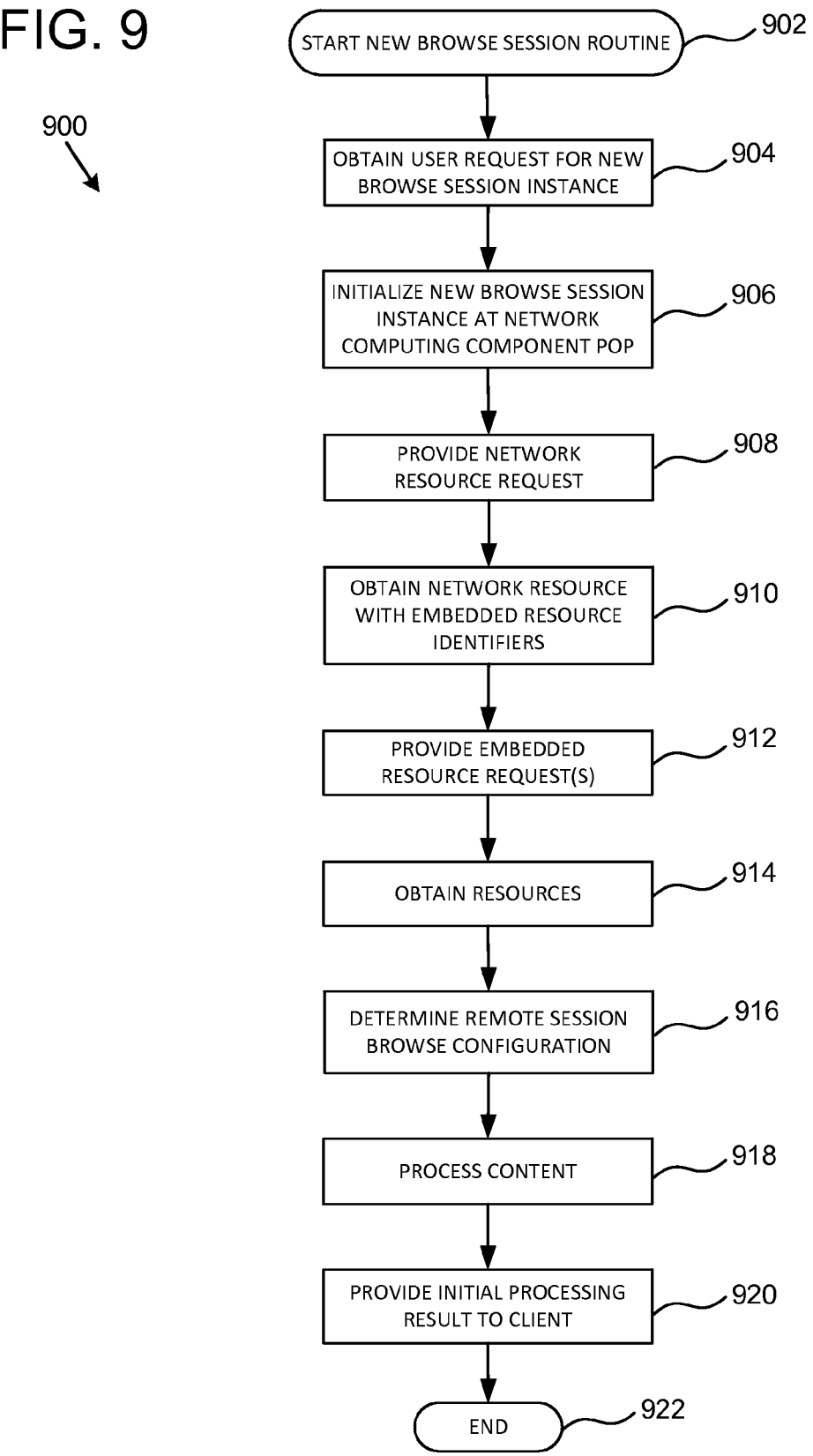
FIG. 9 is a flow diagram illustrative of a new browse session routine implemented by network computing and storage provider.

FIG. 9 is a flow diagram illustrative of a new browse session routine 900 implemented by network computing and storage provider 107 of FIG. 1. New browse session routine 900 begins at block 902. At block 904, the network computing and storage provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing and storage provider 107 may select an associated NCC POP to instantiate a new browse session based on the browse session request. As discussed above with reference to FIG. 1, a network computing and storage provider 107 may include any number of NCC POPs distributed across any number of physical or logical locations. A network computing and storage provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing and storage provider 107 may select a number of NCC POPs to service a browse session request. For example, the network computing and storage provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing and storage provider 107, NCC POP 142 may obtain the browse session request. In one embodiment, NCC POP 142 may have the browse session request forwarded to it by a component of network computing and storage provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing and storage provider 107, may be provided with a subset of information (e.g., just a network address of requested content), or may be provided additional information not included in the original browse session request.

Subsequent to the NCC POP 142 being selected, the network computing and storage provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing and storage provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing and storage provider or NCC POP 142 may instantiate any number of new virtual machine instances and/or browser instances (or make use of existing instantiated instances) based on a single browse session request.

At block 908 the network computing and storage provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing and storage provider 107. One of skill in the art will appreciate that, in the case of other embodiments, the link or network address may correspond to a document or file stored in a digital file locker or other network storage location or at a cache component associated with the network computing and storage provider 107 or client computing device 102. In some embodiments, the new session request may include a document or file in addition to or as an alternative to a network address. At block 910, the network computing and storage provider 107 obtains the one or more network resources. Subsequent to obtaining the requested network resource, the NCC POP 142 may process the network resource to extract embedded resource identifiers.

At block 912, the network computing and storage provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing and storage provider 107 may obtain these embedded resources from any number of different sources, sequentially or in parallel.

At block 916, the network computing and storage provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing and storage provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of a piece of network content be performed at the remote computing device, such as the NCC POP 142, rather than at the client computing device 102. Network content partially (or wholly) processed at the network computing and storage provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing and storage provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing and storage provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browsing configuration that performs a substantial amount of processing at the network computing and storage provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing and storage provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing and storage provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instances executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing and storage provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above.

In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing and storage provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing and storage provider 107 may instantiate a browse session instance running on a first NCC POP and utilizing an RDP protocol as well as browse session instance running on a second NCC POP utilizing an X-Windows protocol. The client computing device 102 or the network computing and storage provider 107 may determine which browse session instance and protocol should be used based on performance or resource usage considerations as described with regards to determining a remote session browse protocol above.

With continued reference to FIG. 9, at block 918, the network computing and storage provider 107 may process the obtained content, including the one or more requested network resources and embedded network resources, according to the determined remote session browsing configuration to generate an initial processing result. At block 920, the network computing and storage provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
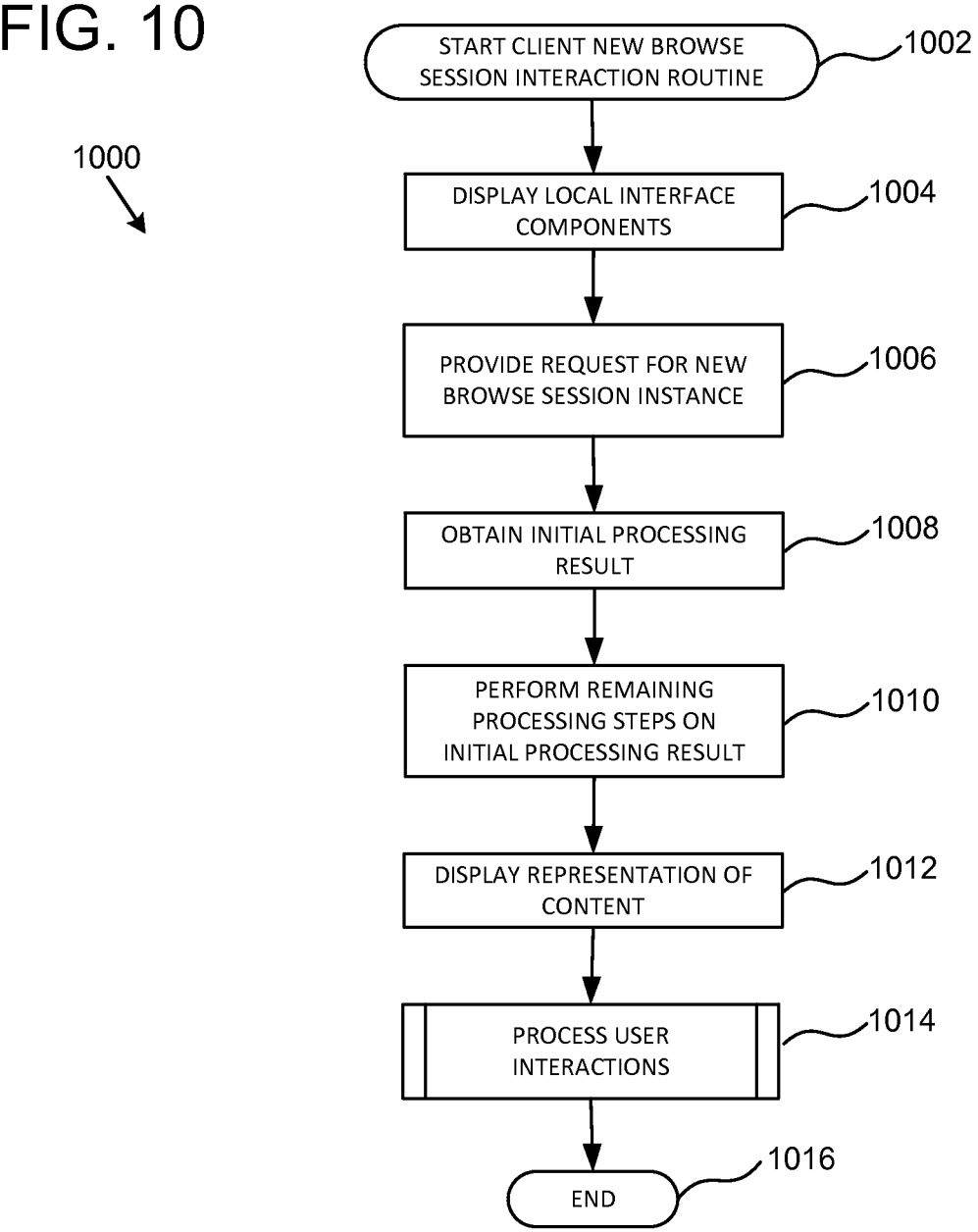
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing and storage provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing and storage provider 107. In an illustrative embodiment, the network computing and storage provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing and storage provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing and storage provider receiving a request for a new browse session instance at block 904 of FIG. 9 above.

At block 1008, the client computing device 102 obtains an initial processing result from the network computing and storage provider 107. Illustratively, the format and data included in the initial processing result may vary based on the remote session browsing configuration selected by the network computing and storage provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing and storage provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
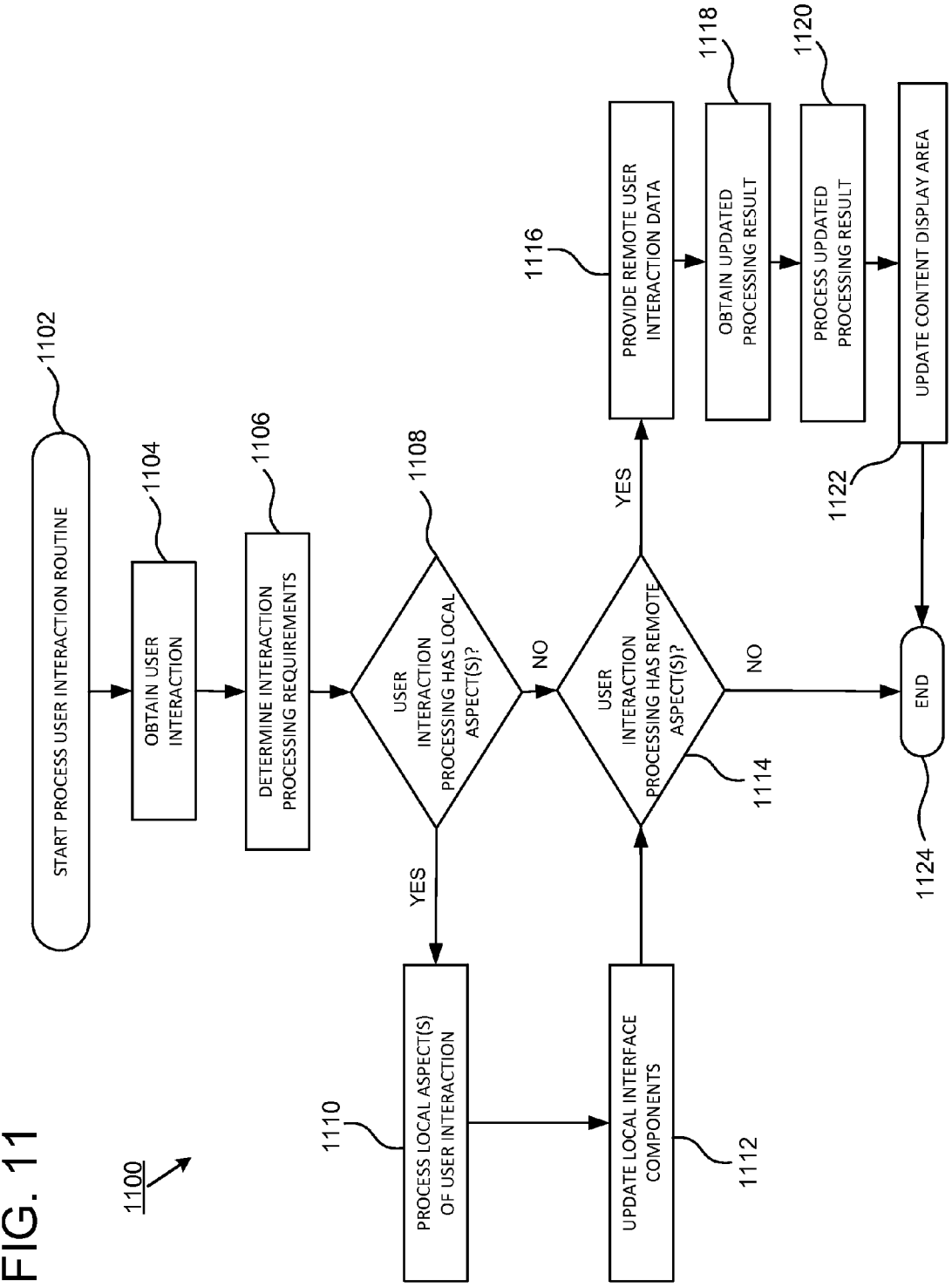
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing and storage provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing and storage provider 107 on a continuous basis, while in other embodiments of remote session browse configurations remote user interaction data may only be provided to the network computing and storage provider 107 when associated with a user interaction that requires remote processing.

At block 1118, the client computing device 102 obtains an updated processing result from the network computing and storage provider 107, the network computing and storage provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

In some embodiments, technologies are provided for predicting which page, or pages, a user will visit next. For example, a user may be viewing a particular web page. Based on one or more prediction models, one or more next web pages (e.g., links within the current web page and/or other web pages) can be predicted (e.g., with associated likelihoods). Predicted next web pages can be obtained in advance of user selection (e.g., network resources can be obtained in advanced, processed, and provided to a client device).

Next web page prediction can provide performance benefits. For example, a server environment can obtain web pages (e.g., obtain network resources for the web pages) in advance of them being requested (e.g., web pages can be pre-fetched and/or pre-rendered). Once a particular web page has been pre-fetched and/or pre-rendered, it can be displayed more efficiently at a client computing device (e.g., it can be cached at a server environment, pre-rendered at a client computing device, or otherwise prepared for more efficient download or display).

Prediction can be performed when a user is browsing web pages from one or more web sites. A web page can be identified by a specific URL and can be associated with a number of network resources. For example, a news web site (e.g., identified by a home web page URL such as http://www.NewsWebsite.com) can comprise a number of web pages (e.g., the home web page, individual news web pages, etc.). As another example, a weather web site (e.g., identified by a home web page URL such as http://www.WeatherWebiste.com) can comprise a number of web pages (e.g., the home web page, individual weather information pages, etc.). A web page can be associated with a number of network resources used to display the web page in a web browser. Examples of network resources include HTML resources, CSS resources, JavaScript code, text, images, videos, etc.

Prediction can be used to identify next web pages that the user is likely to select (e.g., based on the current web page and/or based on other information). Next web pages can refer to links that are selectable from a current web page. For example, a user may be viewing a news web site (http://www.NewsWebsite.com) which can contain a number of links (which can also be called out-links) to other web pages (e.g., local web pages provided by the current web site and/or remote web pages available from other web sites). As an example, the news web site may contain a link to a top news story web page (http://www.NewsWebsite.com/news- _story1.html), a link to a top financial story web page (http://www.NewsWebsite.com/financial_story1.html), a link to a top sports story web page (http://www.NewsWebsite.com/sports_story1.html), and so on. As another example, the news web site may contain a link to a weather story provided by a different web site (e.g., http://www.WeatherWebsite.com/weather_story1.html).

Next web pages can also refer to web pages entered by the user. For example, the may be viewing a news web page (http://www.NewsWebsite.com) and then enter a new URL in the browser field to go to a different web page (e.g., http://www.WeatherWebsite.com/). Similarly the user can go to a different web page by selecting various user interface or menu options (e.g., using a bookmarks menu).

Prediction of next web pages can be performed using a variety of prediction models. The prediction models can be used alone or in combination. Prediction models can also be combined with other prediction techniques.

Some types of prediction models are based on aggregate browsing data from a number of users. Such prediction models can be called aggregate prediction models. With aggregate prediction models, browsing data (e.g., information indicating which web pages users visit during browse sessions) can be collected, anonymized, aggregated, and used to generate a variety of prediction models. Aggregate prediction models can be used to predict which web page (or web pages) a user is likely to visit next based on comparisons to aggregate browsing data from other users. For example, if a particular user is viewing web page A, an aggregate prediction model may indicate that users often visit web page B or web page C after viewing web page A (e.g., with specific likelihoods, such as percentages, of visiting web page B or web page C after web page A).

One type of aggregate prediction model is a 1-N Markov prediction model. With a 1-N Markov prediction model, one or more next web pages can be predicted based on the current web page being viewed (e.g., only based on the current web page without regard to the web pages the user previously viewed). A 1-N Markov prediction model can be generated from aggregate browsing data associated with a plurality of users. With the 1-N Markov prediction model, "1" refers to the current web page being viewed and "N" refers to all the web pages that have been viewed within the aggregate browsing data (e.g., within a given time period). For example, if 100 users visited web page A, and of the 100 users 60 clicked on a link to visit web page B, then the 1-N Markov prediction model can include an indication that the likelihood of selecting web page B from web page A is 60%. Furthermore, if 25 of the 100 users clicked on a link to visit web page C from web page A, then the 1-N Markov prediction model can include an indication that the likelihood of selecting web page C from web page A is 25%. In this way, a 1-N Markov prediction model can include indications of likelihoods of selecting various next web pages (e.g., from links on the current web page and/or by entering or selecting different web pages) based on the currently selected or requested web page (e.g., the web page that the user is currently viewing).

Another type of aggregate prediction model is a k-N Markov prediction model that takes browsing history into account. With a k-N Markov prediction model, one or more next web pages can be predicted based on the last "k" web pages viewed (e.g., based on the current web page and one or more web pages prior to the current web page). A k-N Markov prediction model can be generated from aggregate browsing data associated with a plurality of users, and can contain patterns of web pages along with associated next web page likelihoods. With the k-N Markov prediction model, "k" refers to the number of web pages being matched and "N" refers to all the web pages that have been viewed within the aggregate browsing data (e.g., within a given time period). For example, a k-N Markov prediction model can contain the following next page likelihoods based on users that visited web pages C, D, and E in order:

35% visited page F next
25% visited page G next
18% visited page H next
13% visited page I next If the current user is viewing web page E (and previously viewed web pages C and D), then the k-N Markov prediction model (e.g., where k=3) can provide next page predictions of web pages F, G, H, and/or I with associated likelihoods. For example, the most likely two next web pages (web pages F and G in this example) can be selected in advance of the user selecting a next page and provided (e.g., provided for pre-rendering by the client device in advance of being selected by the user).

Another type of aggregate prediction model is an aggregate prediction model based on association rule mining (ARM) (also called association rule learning). With association rule mining, patterns of web pages can be identified in aggregated browsing data and rules can be developed to predict next web page selection based on the patterns. For example, a pattern of 10 web pages can be identified from aggregate browsing data with indications of one or more next web pages and associated likelihoods. An example rule can be created that matches some of the current user's past 10 web pages (e.g., matches at least 5 out of 10 of the current user's past web pages with the pattern). The rule may match the at least 5 out of 10 pages in order or out-of-order. For example, a rule can match a non-contiguous sequence which matches the user's past web pages in order with the pattern but allows other web pages in the pattern between the matched pages. A rule can also match a contiguous sequence which matches the user's past web pages with the pattern in order and without any other web pages of the pattern in between. A rule can also match an unordered set which matches the user's past web pages with web pages in the pattern in any order. Rules that match a non-contiguous sequence, contiguous sequence, or unordered set can match the full pattern (e.g., the number of web pages in the pattern can be the same as the number of the user's past web pages) or less than the full pattern (e.g., the user's past web pages can be a subset of the full pattern). Rules can be created that use different requirements depending on whether a subset of a pattern of web pages are visited in order or not in order (e.g., a rule that requires a match of at least 5 out of the last 10 web pages in the same order as a 10 web page pattern or a match of at least 8 out of the last 10 web pages but in any order). When matching the user's past web pages with a pattern, the web page that the user is currently viewing can be included. For example, if the user visits web page 1, followed by web page 2, followed by web page 3 (the current web page being viewed), the user's past web pages can be: web pages 1, 2, and 3.

Some types of prediction models are based on user specific browsing data associated with a particular client computing device and/or user (and not with browsing data from other users or devices). Such prediction models can be called user-based prediction models. User-based prediction models can be associated with a particular client computing device, with a particular user account, and/or with a particular user. In some embodiments, user-based prediction models are created from browsing data associated with a specific client computing device (e.g., a specific client computing device associated with a particular user account).

With user-based prediction models, browsing data (e.g., information indicating which web pages users visit during browse sessions) can be collected and used to generate a variety of prediction models. In some embodiments, browsing data is also anonymized.

User-based prediction models can be used to predict which web pages will be selected next based on the user's particular browsing history. For example, a user may often visit a particular news web page followed by a particular weather web page in the morning. Based on this browsing data, a user-based prediction model can be created that includes an indication of a likelihood of visiting the particular weather web page after visiting the particular news web page (e.g., an 80% likelihood). Then, when the user visits the particular news web page, the user-based prediction model can be used to predict that the user will next visit the particular weather web page with an 80% chance. User-based prediction models can also be based on Markov prediction models. For example, similar to the aggregate prediction models, a user-based prediction model can be based on a 1-N Markov model or a k-N Markov model where "N" refers to the pages the user has visited in the past (e.g., within a given time period, which can be a short-term browsing history or a long-term browsing history).

User-based prediction models can be created for various time periods. In some embodiments, user-based prediction models are created from short-term browsing history. For example, user-based prediction models can be created from browsing sessions lasting a number of minutes or hours (e.g., created from the user's last N browse sessions and/or from the user's current browse session). Short-term prediction models can be useful in predicting short-term browsing trends engaged in by users. For example, browsing data for a particular user that often visits web page A followed by web page B each morning can be used to create a short-term prediction model for that user and used to predict the next web page when the user visits web page A in the future.

For example, consider a user that visits a news web page (e.g., http://www.NewsWebsite.com/) and then often (e.g., 7 out of the last 10 times during the past few short-term browsing sessions) clicks on the top news article link on the news web page (e.g., http://www.NewsWebsite.com/top_story.html). A user-based prediction model can be created from the user's short-term browsing history indicating a 70% likelihood of the user selecting the top news article link when the user visits the news web page.

In some embodiments, user-based prediction models are created from long-term browsing history. For example, user-based prediction models can be created from days, months, or years of the user's browsing history. In some embodiments, long-term prediction models are created from 25 months of browsing history. Long-term prediction models can be useful in predicting long-term browsing trends engaged in by users. For example, long-term user-based prediction models can be used to make predictions based on events such as birthdays, yearly travel events (e.g., spring break), anniversaries, monthly activities (e.g., visiting a bill pay web page), etc.

For example, consider a user that has visited a flower web page on Mother's Day the last two years. A user-based prediction model can be created from the user's long-term browsing history including an indication that the user will visit the flower web page on Mother's Day (e.g., an association between the date or event and the flower web page). The user-based prediction model can then be used to predict that the user will visit the flower web page on the next Mother's Day and the flower web page can be pre-fetched and/or pre-rendered ahead of time.

In some embodiments, user-based prediction models can be used for other purposes. For example, user-based prediction models which are anonymized can be used in generating aggregated prediction models. User-based prediction models can also be used, in an anonymous fashion, for predicting browsing patterns for other users (e.g., other users related by demographic and/or other criteria).

Prediction models can be based on information other than browsing data from multiple users (e.g., for aggregate prediction models) or from a particular user (e.g., for user-based prediction models). For example, prediction models can take into account (e.g., determine or adjust likelihood) based on factors such as the time of day a web page was visited (e.g., if a particular user often visits a news web page in the morning, and the current time of day is the evening, the likelihood of visiting the new page can be lowered), whether a web page is bookmarked, whether a web page is currently popular (e.g., trending) on the Internet, and/or based on other factors.

In some embodiments, device tokens are used to anonymize user-based prediction models. A device token refers to a token identifier unique to a particular client computing device, but which cannot be used to identify the particular client computing device. In some embodiments, a device token is used for 30 days (e.g., after which a new device token is generated for the next 30 days). A device token can be used to identify browsing data collected from its associated client computing device and to identify user-based prediction models created from the collected browsing data. User-based prediction models based on device tokens can also be called device token prediction models, and in some embodiments device token prediction models are created from up to 30 days of browsing data.

Prediction models (e.g., aggregate prediction models, user-based prediction models, and/or other types of prediction models) store information used to predict which web page (or web pages) a user will visit. Prediction models can store information related to particular web pages using URLs. In the simplified example below, which can be stored as part of an aggregate prediction model and/or a user-based prediction model, a web page is identified along with probabilities of visiting subsequent web pages (e.g., next web pages):

URL: http://www.NewsWebsite.com/
45%, http://www.NewsWebsite.com/top_story.html
32%, http://www.NewsWebsite.com/finance.html
10%, http://www.NewsWebsite.com/sports.html
4%, http://www.WeatherWebsite.com/
. . .

Prediction models can also store information with reference to web page structure. For example, prediction models can indicate the likelihood of selecting particular items displayed within a web page (e.g., a top news story link, a weather forecast icon, a bill pay link, etc.). Using web page structure can provide flexibility in situations where a particular URL is not available or where a URL can change (e.g., a URL for a top story link may change when the story changes). In the simplified example below, which can be stored as part of an aggregate prediction model and/or a user-based prediction model, a web page is identified along with probabilities of visiting subsequent web pages based on the structure of the web page:

URL: http://www.NewsWebsite.com/
25%, Top news story link

22%, Second news story link
18%, Top sports story link
15%, Top financial story link
12%, Second sports story link
. . .

Prediction models can also store information based on events. For example, prediction models can indicate the likelihood of visiting particular web pages at particular times or dates, or based on other criteria. In the simplified example below, which can be stored as part of an aggregate prediction model and/or a user-based prediction model, a web page is identified along with predicted subsequent web pages (which may, or may not, include probabilities) based on various events:

Event: first Monday of the month
http://www.BillpayWebsite.com/
Event: Birthday
http://www.ShoppingWebsite.com/
Event: Anniversary
50%, http://www.TravelWebsite.com/
30%, http://www.ShoppingWebsite.com/
20%, http://www.FlowerWebsite.com/

Prediction models can also store information using a variety of data structures. For example, prediction models can be stored using text files, key-value pairs, databases, and/or other types of data structures.

In some embodiments, prediction models are stored using key-value pairs in which a key represents a current web page (e.g., the web page currently being viewed or requested by a user or client computing device) and a value represents possible next web pages and associated likelihoods. Below is an example of key-value pair information (using JavaScript Object Notation (JSON) format) that can be stored in a prediction model:

```
Key: www.NewsWebsite.com
Value:
{
    "http://www. NewsWebsite.com/pages/todayspaper/index.html": {
        "hitProbability": .8
    },
    "http://www. NewsWebsite.com/pages/todayspaper/page1.html": {
        "hitProbability": .1
    },
    "http://www. NewsWebsite.com/pages/todayspaper/page2.html": {
        "hitProbability": .05
    },
    "http://www. NewsWebsite.com/pages/todayspaper/page3.html": {
        "hitProbability": .05
    }
}
```

In this example, the key is the current web page the user is visiting and the values are the probabilities of visiting other web pages from the current web page where the probability of visiting a particular web page is expressed in decimal form. For example, the probability of visiting the web page "http://www.NewsWebsite.com/pages/todayspaper/index.html" next is 80%.

A prediction model can store information related to one or more web pages and/or events. For example, a prediction model can store information for each of a number of web pages with associated web pages likely to be visited next (e.g., for web page A, likelihoods of visiting web pages B, C, and D; for web page E, likelihoods of visiting web pages F and G; and so on).

Prediction models can be stored at a server environment (e.g., at a network computing and storage provider) and/or at a client computing device. In some embodiments, user-based prediction models are stored in user profiles (e.g., a user profile for a specific user can store user-based prediction models associated with the specific user). In some embodiments, prediction models based on aggregated browsing data are stored at a server environment. In some situations, a server environment can provide computing resources for efficiently collecting and aggregating browsing data for multiple users and creating aggregated prediction models.

Prediction models can be used to predict which web page (or which web pages) will be visited (e.g., will be visited next) by a user. In some embodiments, prediction models are obtained and evaluated at a server environment (e.g., at a cloud-based or network-based web browsing environment operated by one or more computer servers, such as a network computing and storage provider). The server environment can store prediction models (e.g., aggregate prediction models and/or user-based prediction models) for a number of users and client computing devices that use the server environment (e.g., that use the cloud-based web browsing services provided by the server environment). For example, the server environment can obtain a prediction model (or multiple prediction models) during a browse session associated with a user or the user's client computing device and predict web pages that the user will likely visit. For example, if the user is currently viewing web page A, the server environment can check the prediction models to see which web page (or web pages) the user is likely to visit next (e.g., search the prediction models for a key associated with web page A and determine which web pages the user is likely to visit next). Based on the prediction, the server environment can obtain and provide network resources for the predicted web page (or web pages) to the user (e.g., to the user's client computing device).

In some embodiments, prediction models are obtained and evaluated at a client computing device. The client computing device can store or obtain prediction models (e.g., aggregate prediction models and/or user-based prediction models). For example, the client computing device can obtain a prediction model (or multiple prediction models) for use in predicting web pages that the user will likely visit. For example, if the user is currently viewing web page A, the client computing device can check the prediction models to see which web page (or web pages) the user is likely to visit next (e.g., search the prediction models for a key associated with web page A and determine which web pages the user is likely to visit next). Based on the prediction, the client computing device can obtain network resources for the predicted web page (or web pages).

In some embodiments, prediction models are obtained and/or evaluated using a combined approach. For example a server environment can store and evaluate aggregate prediction models while a client computing device can store and evaluate user-based prediction models.

Once web pages have been predicted as likely to be visited, the web pages can be pre-fetched (e.g., pre-fetched in advance of being visited by a user or client computing device). Pre-fetching web pages can comprise obtaining network resources associated with the web pages (e.g., HTML resources, CSS resources, JavaScript code, text, images, videos, etc.). In some embodiments, pre-fetching web pages is performed by a server environment. For example, the server environment can pre-fetch one or more web pages likely to be visited next and store the pre-fetched web pages so that they are ready for sending to a client computing device when needed (e.g., upon receiving a request from the client computing device). The server environment can also send the pre-fetched web pages to the client computing device in advance (e.g., in advance of receiving a request from the client computing device). The server environment can also perform processing operations on the pre-fetched web pages (e.g., one or more of the processing operations described above with reference to FIG. 8).

In some embodiments, pre-fetching web pages is performed by a client computing device. For example, the client computing device can pre-fetch one or more web pages likely to be visited next and store the pre-fetched web pages so that they are ready when needed (e.g., ready to be processed, rendered, and displayed from locally stored pre-fetched network resources upon user selection). The client computing device can also perform processing operations on the pre-fetched web pages (e.g., one or more of the processing operations described above with reference to FIG. 8). In some embodiments, a combined approach can be used in which the server environment pre-fetches some web pages while the client computing device pre-fetches other web pages (e.g., based on where various prediction models are evaluated).

In addition to obtaining web pages in advance (e.g., performing pre-fetching), web pages can be pre-rendered in advance. Pre-rendering can include obtaining network resources associated with the web pages and performing processing operations such that the web pages are ready (or nearly ready) for display. In some embodiments, web pages are pre-rendered by a server environment (e.g., display-ready bitmap pages are created). For example, the server environment can obtain network resources, process the network resources to create pre-rendered web pages, and store the pre-rendered web pages for sending to the client computing device upon request (e.g., when the client computing device visits the web pages) or send the pre-rendered web pages to the client computing device ahead of time (e.g., before the user of the client computing device visits the web pages).

In some embodiments, web pages are pre-rendered by a client computing device. For example, the client computing device can retrieve network resources associated with the web pages or obtain the network resources from the server environment (e.g., with some processing operations already performed). The client computing device can pre-render the web pages and have them ready when the user selects one of the web pages (e.g., when the user clicks a link or enters a URL for one of the web pages). For example, the client computing device can pre-render one or more web pages in an off-screen buffer so that the pre-rendered one or more web pages can be displayed immediately (or nearly immediately) when needed. In some embodiments, the client computing device pre-renders one or more web pages in the background in advance of the one or more web pages being selected. When one of the one or more web pages is selected, the client computing device can display the corresponding pre-rendered web page.

It should be understood that web pages that are pre-fetched and/or pre-rendered may not be used. For example, even if a prediction model predicts that a user is likely to visit web page B after web page A, the user may in fact not visit web page B (e.g., the user may stop browsing after web page A, or may visit web page C next instead of web page B).

In some embodiments, the number of web pages that are pre-fetched and/or pre-rendered is limited. Limitations can be imposed based on a variety of criteria, such as a prediction threshold (e.g., a threshold likelihood), an amount of memory or storage (e.g., the amount of memory available at a client computing device for storing pre-fetched or pre-rendered web pages), and/or based on other criteria. For example, consider a browsing situation where a web page contains 50 links to other web pages and where a prediction model contains probabilities of a user selecting each of the 50 links. In this example situation, criteria can be used to limit which of the 50 web pages are pre-fetched and/or pre-rendered. Example criteria can include: only the top 10 web pages based on priority, only those web pages with a probability over 25%, pages in order of priority until a threshold amount of storage is used (e.g., 15 MB), etc.

Privacy can be provided when storing prediction models at a server environment (e.g., at a cloud environment). For example, aggregate browsing data can be collected that does not identify particular users. Furthermore browsing data stored in a prediction model (e.g., a user-based prediction model) can be anonymized. For example, a mapping from client device serial number to a unique token can be maintained for storing user-based prediction models at a server environment.

Figure 12:
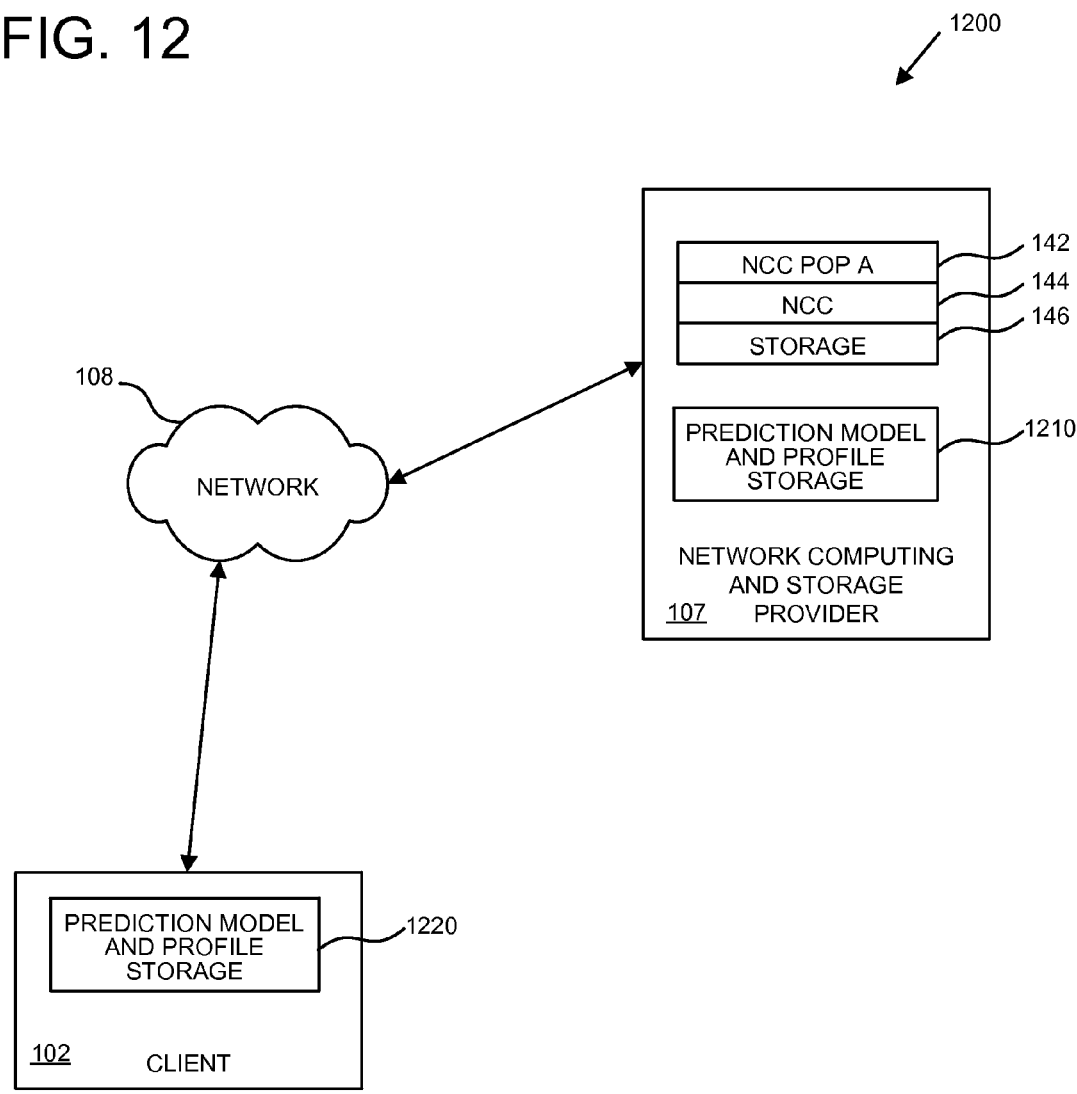
FIG. 12 is a block diagram of the content delivery environment of FIG. 1 in which prediction models are used for next web page prediction.
Figure 13:
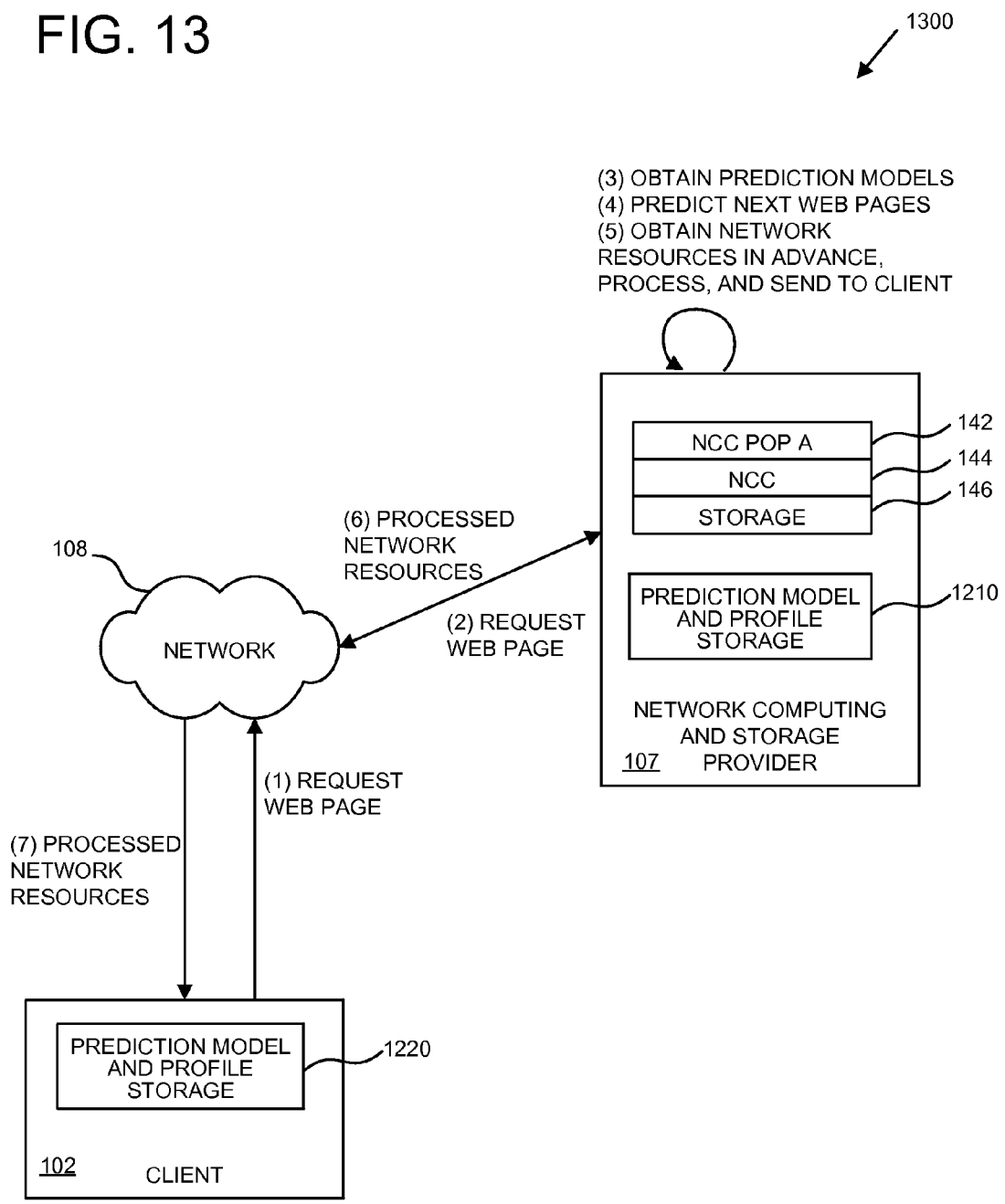
FIG. 13 is a block diagram of the content delivery environment of FIG. 1 illustrating prediction of next web pages and obtaining network resources for the next web pages in advance.

With reference now to FIGS. 12 and 13, the interaction between various components of the networked computing environment 100 of FIG. 1 will be discussed in the context of web page prediction.

FIG. 12 is a block diagram 1200 of the content delivery environment of FIG. 1 in which prediction models are used for next web page prediction. As depicted in the diagram 1200, a client computing device 102 can communicate with network computing and storage provider 107 via the network 108. Specifically, the client computing device 102 can perform web browsing activities, including web page prediction, in association with the network computing and storage provider 107. While only one client computing device 102 is depicted, the environment supports multiple client computing devices.

In some embodiments, the network computing and storage provider 107 performs web page prediction using prediction models and/or user profiles (e.g., stored in the prediction model and profile storage 1210). Prediction models and/or user profiles can also be stored in NCC storage (e.g., in storage 146). For example, the network computing and storage provider 107 can obtain prediction models (e.g., from storage 1210 and/or storage 146), including aggregate prediction models and/or user-based prediction models, predict one or more web pages that the user is likely to visit (e.g., that the user of client computing device 102 is likely to visit next), obtain network resources for the predicted web pages, process the obtained network resources, and send the processed network resources to the client computing device 102 ahead of time. In some embodiments, the network computing and storage provider 107 can obtain, process, and/or send network resources in advance of receiving a request from the client computing device 102 for the predicted web pages (e.g., before the user of the client computing device 102 selects a predicted web page).

In some embodiments, the client computing device 102 performs web page prediction using prediction models and/or user profiles (e.g., stored in the prediction model and profile storage 1220). For example, the client computing device 102 can obtain prediction models (e.g., from storage 1220), including aggregate prediction models and/or user-based prediction models, predict one or more web pages that the user is likely to visit, obtain network resources for the predicted web pages, process the obtained network resources, and prepare them for display (e.g., pre-render web pages in an off-screen buffer of the client computing device 102). The client computing device 102 can obtain, process, and/or pre-render network resources in advance of the user requesting (e.g., selecting a link or entering a URL) the predicted web pages.

In some embodiments, both the client computing device 102 and the network computing and storage provider 107 can store prediction models (e.g., stored as part of user profiles and/or stored independently). For example, the client computing device 102 can store user-based prediction models specific to the user of the client computing device 102 in the storage 1220. The network computing and storage provider 107 can store aggregate prediction models in the storage 1210. However, storage of prediction models is not limited to this arrangement (e.g., the network computing and storage provider 107 can store user-based prediction models in the storage 1210, and the client computing device 102 can store aggregate prediction models in the storage 1220).

FIG. 13 is a block diagram 1300 illustrating operations for performing web page prediction according to some embodiments. With reference to the diagram 1300, the client computing device 102 requests a web page (which can be called a current web page) from the network computing and storage provider 107. For example, the computing device 102 can request the web page during a browse session. The network computing and storage provider 107 can provide network resources associated with the current web page for display by the client computing device 102. While only one client computing device 102 is depicted, the environment supports multiple client computing devices.

The network computing and storage provider 107 obtains one or more prediction models from the prediction model and user profile storage 1210. For example, the network computing and storage provider 107 can obtain aggregate prediction models and/or user-based prediction models (e.g., prediction models specific to the client computing device 102). From the obtained prediction models, the network computing and storage provider 107 predicts one or more next web pages to be selected client computing device 102 (e.g., by the user of the client computing device 102). The predicted next web pages can be associated with likelihoods of the user selecting the next web pages (e.g., percentages). Once the next web pages have been predicted, the network computing and storage provider 107 obtains network resources for the predicted next web pages, performs optional processing of the obtained network resources, and sends the processed network resources to the client computing device 102 ahead of time. In some embodiments, the network computing and storage provider 107 performs the prediction and obtains the network resources for the predicted next web pages in advance of the client computing device 102 requesting the next web pages. In some embodiments, the network computing and storage provider 107 performs the prediction, obtains the network resources, performs the optional processing, and sends the processed network resources to the client computing device 102 in advance of the client computing device 102 requesting the next web pages.

In some embodiments, the client computing device 102 also stores prediction models (e.g., within user profiles) in the prediction model and profile storage 1220. For example, the client computing device 102 can store user-based prediction models (e.g., to perform pre-fetching and/or pre-rendering of predicted next web pages). In such embodiments, the client computing device 102 can perform prediction of next web pages, retrieve network resources, process the retrieved network resources, and/or pre-render the next web pages so they are ready for immediate display when requested by the user. In some situations, the client computing device 102 may operate independently of the network computing and storage provider 107, and in other situations the client computing device 102 may work with the network computing and storage provider 107 (e.g., with some prediction performed at the network computing and storage provider 107 and other prediction performed at the client computing device 102).

Figure 14:
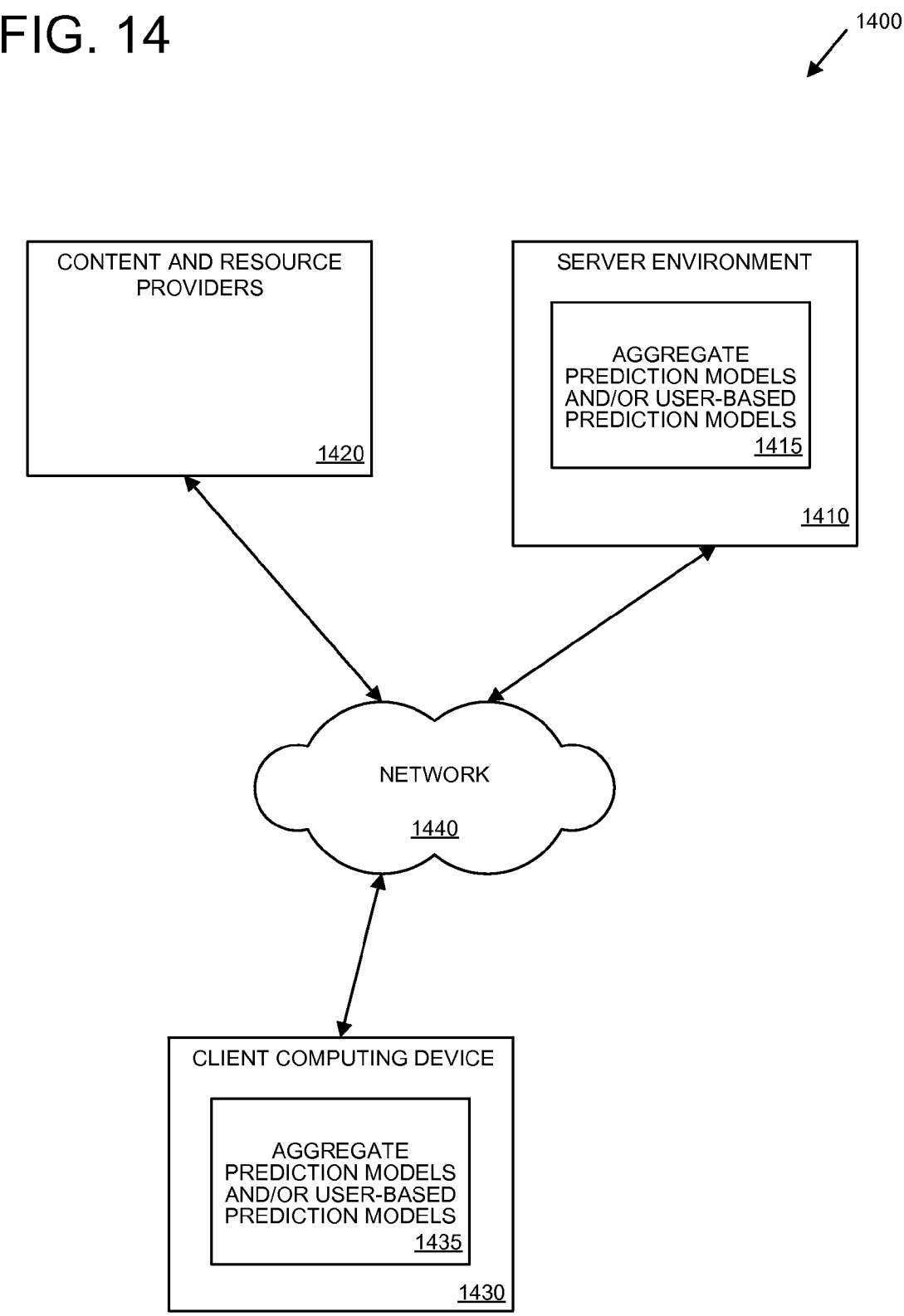
FIG. 14 is a block diagram depicting an example environment in which prediction models are used for next web page prediction.

FIG. 14 is a block diagram depicting an example environment 1400 in which prediction models are used for next web page prediction. The example environment 1400 includes a server environment 1410 (e.g., a cloud-based or network-based web browsing environment operated by one or more computer servers, such as a network computing and storage provider). The server environment 1410 can create and/or store prediction models 1415 (e.g., aggregate prediction models and/or user-based prediction models). For example, the server environment 1410 can collect browsing data from a number of users and/or client computing devices (e.g., client computing device 1430) and create aggregate prediction models and/or user-based prediction models.

The example environment 1400 supports network-based or cloud-based web browsing as well as "normal" web browsing. For example, many client computing devices, such as client computing device 1430, can participate in network-based browse sessions by sending requests for web pages to the server environment 1410 via the network 1440. The server environment 1410 can obtain network resources for the requested web pages (e.g., from content providers 1420 and/or from locally cached resources). The server environment 1410 can perform processing on the obtained network resources (e.g., HTML processing, CSS processing, image processing, etc.) and send the processed network resources to the client computing devices for display. For example, the server environment 1410 and the client computing devices (e.g., client computing device 1430) can divide web browsing operations in various ways, such as those described with regard to FIG. 8. The client computing devices, such as client computing device 1430, can also participate in normal browsing activities which may not involve communication with the server environment 1410. For example, the client computing devices can directly browse web pages, obtain network resources (e.g., from content providers 1420 and/or from locally cached resources), and display the web pages based on the obtained network resources.

The example environment 1400 supports next web page prediction based on prediction models. For example, the server environment 1410 can predict which web page (or web pages) a user and/or client computing device (e.g., client computing device 1430) will visit next based on various prediction models (e.g., based on one or more aggregate prediction models and/or user-based prediction models 1415). The server environment 1410 can pre-fetch and/or pre-render predicted next web pages in advance of the next web pages being selected or requested (e.g., by client computing device 1430). For example, the server environment 1410 can obtain network resources for one or more of the predicted next web pages. The server environment 1410 can perform various processing operations on the obtained network resources (e.g., HTML processing, CSS processing, image processing, etc.). The server environment 1410 can store processed network resources (e.g., as pre-fetched and/or pre-rendered network resources). The server environment 1410 can send processed network resources to the client computing device (e.g., to client computing device 1430).

The server environment 1410 can perform the prediction based on the currently requested web page (e.g., based on the currently-requested web page from the user of the client computing device 1430). For example, the server environment 1410 can obtain various aggregate prediction models (e.g., 1-N Markov models, k-N Markov models, ARM based models, and/or other prediction models based on aggregate browsing data) and/or user-based prediction models (e.g., long-term user-based prediction models, short-term user-based prediction models, and/or other user-based prediction models) and predict which web page (or web pages) are likely to be visited next after the currently-requested web page. One or more of the predicted web pages can then be pre-fetched and/or pre-rendered (e.g., network resources can be obtained and sent to the client computing device 1430 for pre-rendering). The server environment 1410 can also perform the prediction based on other criteria (e.g., based on the time of day and/or the date, based on a recurring event such as a birthday or anniversary, etc.).

Prediction can also be performed by client computing devices (e.g., by client computing device 1430) separately or in combination with the server environment 1410. For example, client computing device 1430 can predict which web page (or web pages) the user will visit next based on various prediction models (e.g., based on one or more aggregate prediction models and/or user-based prediction models 1435). The client computing device 1430 can pre-fetch and/or pre-render predicted next web pages in advance of the next web pages being selected. For example, the client computing device 1430 can obtain network resources for one or more of the predicted next web pages. The client computing device 1430 can store the pre-fetched network resources (e.g., with or without performing various processing operations to prepare the network resources for quicker display). The client computing device 1430 can pre-render the network resources (e.g., prepare the web pages for immediate display by rendering them to an off-screen buffer).

The client computing device 1430 can perform the prediction based on the web page currently being displayed or accessed by the user. For example, client computing device 1430 can obtain various aggregate prediction models (e.g., 1-N Markov models, k-N Markov models, ARM based models, and/or other prediction models based on aggregate browsing data) and/or user-based prediction models (e.g., long-term user-based prediction models, short-term user-based prediction models, and/or other user-based prediction models) and predict which web page (or web pages) are likely to be visited next after the current web page. One or more of the predicted web pages can then be pre-fetched and/or pre-rendered. The client computing device 1430 can also perform the prediction based on other criteria (e.g., based on the time of day and/or the date, based on a recurring event such as a birthday or anniversary, etc.).

Prediction can also be performed by the content and resource providers 1420 separately or in combination with the server environment 1410 and/or client computing device 1430. For example, the client computing device 1430 can request web page resources directly from the content and resource providers 1420 and the content and resource providers 1420 can predict which web page (or web pages) the user will visit next. For example, the content and resource providers 1420 can base the prediction on which web pages provided by the content and resource providers 1420 other users visited next (e.g., the content and resource providers 1420 can create aggregate models based on observed browsing history). The content and resource providers 1420 can also base the prediction on other criteria (e.g., by storing a user profile representing browsing history of the client computing device 1430 observed by the content and resource providers 1420).

Figure 15:
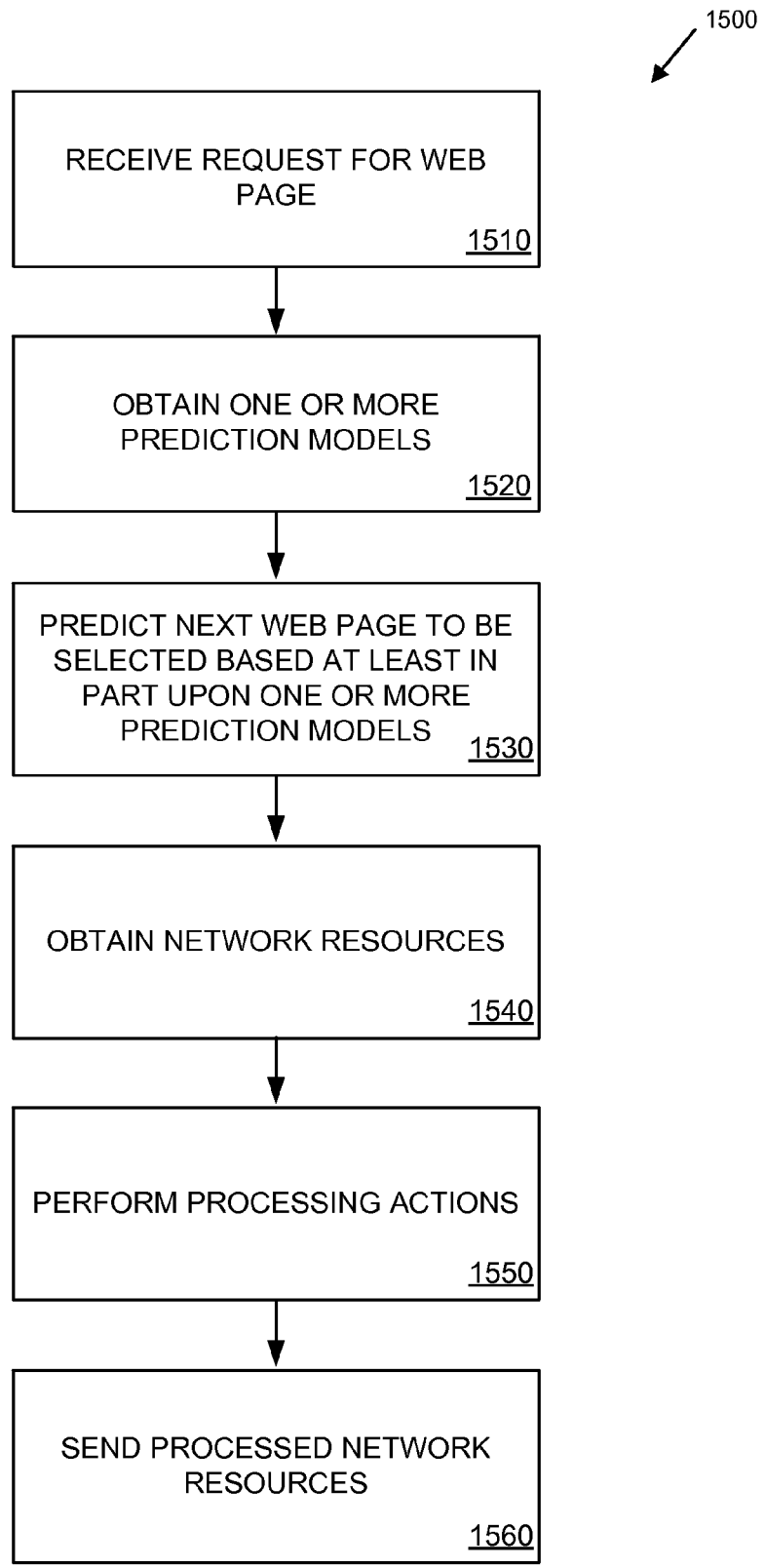
FIG. 15 is a flow diagram depicting an example method for predicting next web page selection.

FIG. 15 is a flow chart of an example method 1500 for predicting next web page selection. For example, the example method 1500 can be performed by the network computing and storage provider 107 described above with regard to FIGS. 12 and 13 or the server environment 1410 described above with regard to FIG. 14.

At 1510, a request for a web page is received. For example, the request for the web page can be received by a server environment (e.g., by a network computing and storage provider) from a client computing device. The request for the web page can be received as part of a browse session associated with a user of the client computing device (e.g., a user-operated client computing device).

At 1520, one or more prediction models are obtained. The prediction models can include aggregate prediction models, user-based prediction models, and/or other types of prediction models. The prediction models can be stored at the network computing and storage provider or obtained from another source. In some embodiments, the one or more prediction models comprise an aggregate prediction model.

At 1530, one or more next web pages are predicted based at least in part on the one or more prediction models obtained at 1520. The prediction models can contain an indication of the likelihood of selecting each of the one or more next web pages.

At 1540, network resources associated with the predicted next web pages are obtained. The network resources can be obtained proactively in advance of receiving a request indicating user selection of the next web pages (e.g., in advance of the user selecting or entering one of the next web pages in the user's web browser).

At 1550, one or more processing actions are performed in relation to the obtained network resources. For example, the processing actions can include HTML processing, CSS processing, image processing, etc. Processing can include pre-rendering.

At 1560, the processed network resources are sent to the client computing device. The client computing device can store the processed network resources until they are needed (e.g., until they are needed for display upon user-selection of a next web page). The client computing device can pre-render next web pages based on the received network resources.

Figure 16:
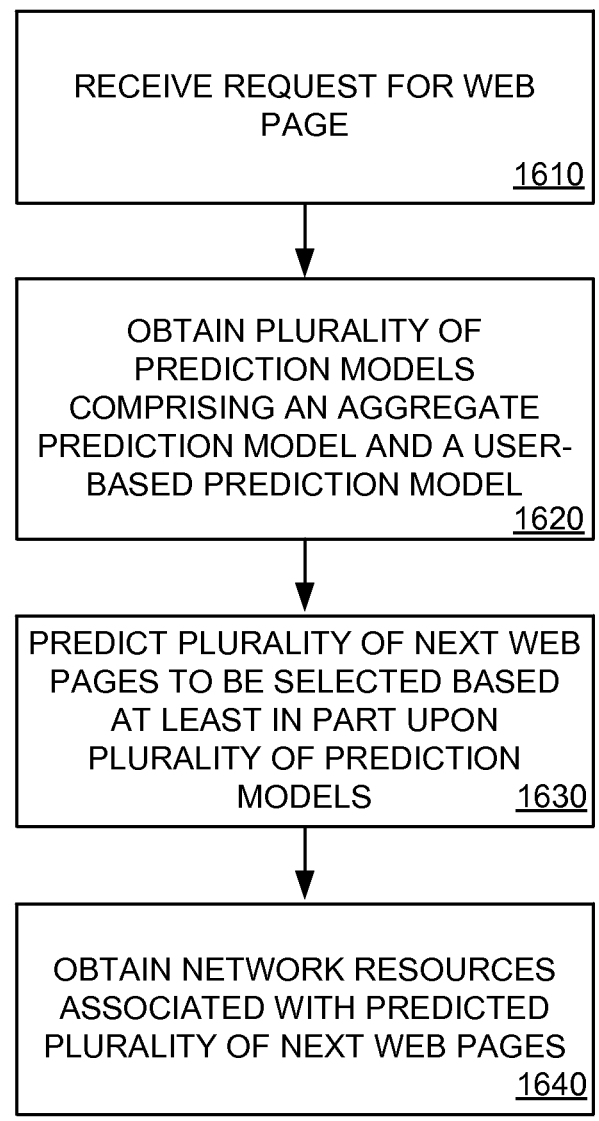
FIG. 16 is a flow diagram depicting an example method for predicting next web page selection based on a plurality of prediction models.

FIG. 16 is a flow chart of an example method 1600 for predicting next web page selection based on a plurality of prediction models. For example, the example method 1600 can be performed by the network computing and storage provider 107 described above with regard to FIGS. 12 and 13 or the server environment 1410 described above with regard to FIG. 14.

At 1610, a request for a web page is received from a user-operated client computing device. For example, the request for the web page can be received by a server environment (e.g., by a network computing and storage provider) from the user-operated client computing device. The request for the web page can be received as part of a browse session associated with the user of the user-operated client computing device.

At 1620, a plurality of prediction models are obtained. The prediction models comprise a user-based prediction model generated from browsing data associated with the user-operated client computing device and an aggregate prediction model based on aggregate browsing data associated with a plurality of user-operated computing devices. The prediction models can be stored at the server environment or obtained from another source.

At 1630, a plurality of next web pages are predicted based at least in part on the plurality of prediction models obtained at 1620. The prediction can indicate the likelihood of selecting one or more of the plurality of next web pages.

At 1640, network resources associated with the predicted plurality of next web pages are obtained. The network resources can be obtained proactively in advance of receiving a request for any of the plurality of next web pages form the user-operated client computing device. For example, the network resources can be pre-fetched and/or pre-rendered by the server environment. The network resources can also be sent (e.g., with or without processing operations being performed) to the user-operated client computing device (e.g., for pre-rendering).

Figure 17:
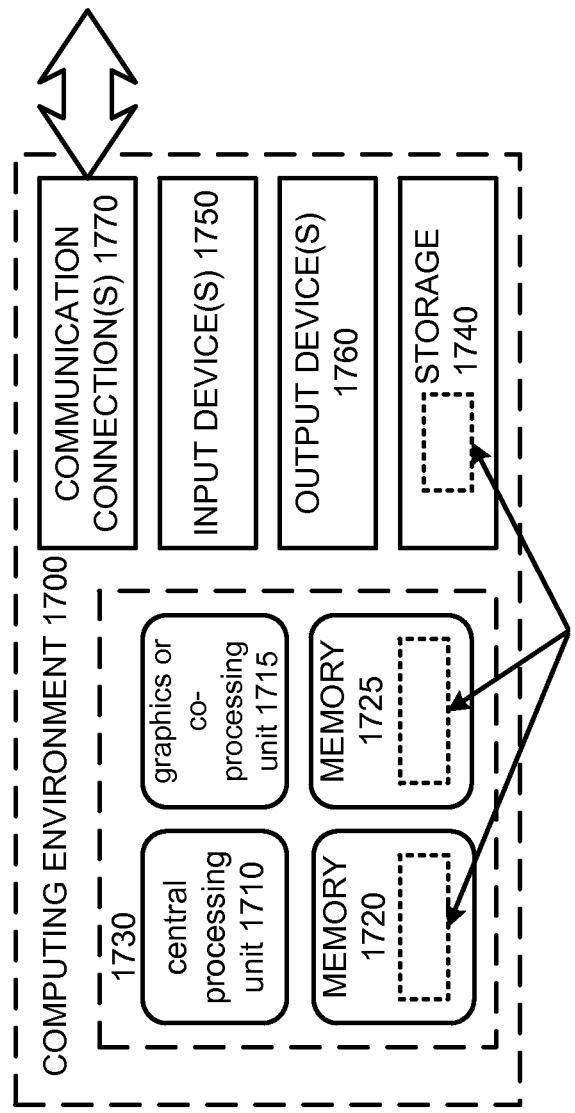
FIG. 17 depicts a generalized example of a suitable computing environment in which the described innovations may be implemented.

FIG. 17 depicts a generalized example of a suitable computing environment 1700 in which the described innovations may be implemented. The computing environment 1700 is not intended to suggest any limitation as to scope of use or functionality, as the innovations may be implemented in diverse general-purpose or special-purpose computing systems. For example, the computing environment 1700 can be any of a variety of computing devices (e.g., desktop computer, laptop computer, server computer, tablet computer, smart phone, etc.)

With reference to FIG. 17, the computing environment 1700 includes one or more processing units 1710, 1715 and memory 1720, 1725. In FIG. 17, this basic configuration 1730 is included within a dashed line. The processing units 1710, 1715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s).

A computing system may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing environment 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing environment 1700. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented at least in part by a network computing and storage provider, for predicting next web page selection, the method comprising:
   receiving, by the network computing and storage provider from a client computing device associated with a user, a request for a web page during a browse session;
   obtaining, by the network computing and storage provider, at least one prediction model, the at least one prediction model comprising an aggregate prediction model based on aggregate browsing data from a plurality of users;
   predicting, by the network computing and storage provider, a next web page to be selected by the user of the client computing device, wherein the prediction is based at least in part upon the aggregate prediction model, wherein the aggregate prediction model comprises an indication of a likelihood of selecting the next web page;
   obtaining, by the network computing and storage provider, network resources associated with the predicted next web page, wherein the network resources are obtained proactively in advance of receiving a request indicating user selection of the next web page; and
   proactively in advance of receiving a request indicating user selection of the next web page:
      performing, by the network computing and storage provider, one or more processing actions in relation to the obtained network resources; and
      sending, by the network computing and storage provider, the processed network resources to the client computing device.

2. The method of claim 1 wherein the aggregate prediction model is a 1-N Markov prediction model, wherein the 1-N Markov prediction model comprises the indication of the likelihood of selecting the next web page from the web page.

3. The method of claim 1 wherein the aggregate prediction model is a k-N Markov prediction model, wherein the k-N Markov prediction model comprises the indication of the likelihood of selecting the next web page from the web page and from a last k web pages visited by the user.

4. The method of claim 1 wherein the aggregate prediction model is an association rule mining model that comprises one or more rule for matching one or more patterns of previously visited web pages by the user.

5. The method of claim 1 wherein the aggregate prediction model is an association rule mining model that comprises a rule for matching a plurality of previously visited web pages by the user with a pattern of web pages generated from aggregate browsing data, wherein the plurality of previously visited web pages are matched in a non-contiguous sequence with the pattern of web pages.

6. The method of claim 1 wherein the aggregate prediction model is an association rule mining model that comprises a rule for matching a plurality of previously visited web pages by the user with a pattern of web pages generated from aggregate browsing data, wherein the plurality of previously visited web pages are matched as an unordered set with the pattern of web pages, and wherein the pattern of web pages contains at least the plurality of previously visited web pages.

7. The method of claim 1 wherein the aggregate prediction model is an association rule mining model that comprises a rule for matching a plurality of previously visited web pages by the user with a pattern of web pages generated from aggregate browsing data, wherein the plurality of previously visited web pages are matched in a contiguous sequence with the pattern of web pages.

8. The method of claim 1 wherein the at least one prediction model further comprises at least one of:
   a first user-based prediction model comprising short-term browsing data associated with the client computing device, wherein the first user-based prediction model uses a k-N Markov model where k is at least one and N represents a history of web pages in the short-term browsing data; and
   a second user-based prediction model comprising long-term browsing data associated with the client computing device, wherein the second user-based prediction model uses a k-N Markov model where k is at least one and N represents a history of web pages in the long-term browsing data.

9. The method of claim 1 wherein the one or more processing actions are performed proactively in advance of receiving a request indicating user selection of the next web page, and wherein the processed network resources are sent proactively in advance of receiving a request indicating user selection of the next web page.

10. The method of claim 1 wherein the processed network resources are sent to the client computing device for pre-rendering by the client computing device so that the next web page is ready for immediate display upon user selection of the next web page.

11. A computing device comprising:
one or more processing units; and
one or more network interfaces;
the computing device configured to performing operations for predicting next web page selection, the operations comprising:
receiving a request for a web page, the request associated with a user-operated client computing device;
obtaining a user-based prediction model generated from browsing data associated with the user-operated client computing device;
predicting a next web page to be selected by the user-operated client computing device, wherein the prediction is based at least in part upon the user-based prediction model, wherein the user-based prediction model comprises an indication of a likelihood of selecting the next web page;
obtaining network resources associated with the predicted next web page, wherein the network resources are obtained in advance of receiving a request indicating selection by the user-operated client computing device of the next web page; and
in advance of receiving a request indicating selection by the user-operated client computing device of the next web page:
performing one or more processing actions in relation to the obtained network resources; and
providing the processed network resources for sending to the client computing device.

12. The computing device of claim 11 wherein the user-based prediction model is a short-term user-based prediction model generated from short-term browsing history associated with the user-operated client computing device.

13. The computing device of claim 12 wherein the short-term user-based prediction model is generated from a plurality of browse sessions of the user-operated client computing device.

14. The computing device of claim 11 wherein the user-based prediction model is a long-term user-based prediction model generated from long-term browsing history associated with the user-operated client computing device.

15. The computing device of claim 11 wherein the user-based prediction model is a device-token user-based prediction model.

16. The computing device of claim 11 wherein the user-based prediction model is a long-term user-based prediction model generated from long-term browsing history associated with the user-operated client computing device, wherein the long-term browsing history is more than about a month, the operations further comprising:
obtaining a second user-based prediction model generated from short-term browsing data associated with the user-operated client computing device, wherein the short-term browsing data is less than about a month, wherein the prediction is also based at least in part upon the second user-based prediction model.

17. The computing device of claim 11 wherein the user-based prediction model comprises:
for each of a plurality of web pages:
indications of one or more next web pages and corresponding likelihoods of selecting the one or more next web pages.

18. The computing device of claim 11 wherein the next web page is located at a different web site than the web page.

19. The computing device of claim 11 wherein the next web page is located at a same web site as the web page, and wherein the next web page is accessible via one or more of:
a link on the web page; and
selection or entry of the next web page within a browser.

20. The computing device of claim 11 wherein the obtained network resources are pre-fetched by the user-operated client computing device.

21. The computing device of claim 11 wherein the user-operated client computing device obtains additional network resources associated with an additional predicted next web page from one or more content providers.

22. The computing device of claim 11 wherein other network resources are pre-fetched and stored at the computing device and provided to the user-operated client computing device upon request.

23. A non-transitory computer-readable storage medium storing computer-executable instructions for causing a computing device to perform operations for predicting next web page selection, the operations comprising:
receiving a request for a web page, the request associated with a user-operated client computing device;
obtaining a plurality of prediction models comprising:
a user-based prediction model generated from browsing data associated with the user-operated client computing device; and
an aggregate prediction model based on aggregate browsing data associated with a plurality of user-operated client computing devices;
predicting a plurality of next web pages to be selected by the user-operated client computing device, wherein the prediction is based at least in part upon the plurality of prediction models, wherein the prediction comprises indications of corresponding likelihoods of selecting the plurality of next web pages;
obtaining network resources associated with the predicted plurality of next web pages, wherein the network resources are obtained in advance of receiving a request indicating selection by the user-operated client computing device of any of the plurality of next web pages; and
in advance of receiving a request indicating selection by the user-operated client computing device of any of the plurality of the next web pages:
performing one or more processing actions in relation to the obtained network resources; and
providing the processed network resources for sending to the client computing device.

24. The computer-readable storage medium of claim of claim 23, wherein the user-based prediction model is one of a long-term user-based prediction model and a short-term user-based prediction model, and wherein the aggregate prediction model is one of a 1-N Markov prediction model and a k-N Markov prediction model.

25. The computer-readable storage medium of claim of claim 23 the operations further comprising, proactively in advance of receiving a request indicating selection by the user-operated client computing device of any of the plurality of next web pages:
   performing one or more processing actions in relation to the obtained network resources; and
   sending the processed network resources to the client computing device for pre-rendering at the client computing device.

* * * * *